United States Patent
Sudo

(10) Patent No.: US 9,182,827 B2
(45) Date of Patent: Nov. 10, 2015

(54) INFORMATION PROCESSING APPARATUS, IMAGE DISPLAY APPARATUS, AND INFORMATION PROCESSING METHOD

(75) Inventor: Fukukyo Sudo, Nagano (JP)

(73) Assignee: Sony Corporation (JP)

( * ) Notice: Subject to any disclaimer, the term of this patent is extended or adjusted under 35 U.S.C. 154(b) by 109 days.

(21) Appl. No.: 14/006,870

(22) PCT Filed: Feb. 17, 2012

(86) PCT No.: PCT/JP2012/001076
§ 371 (c)(1),
(2), (4) Date: Oct. 23, 2013

(87) PCT Pub. No.: WO2012/132201
PCT Pub. Date: Oct. 4, 2012

(65) Prior Publication Data
US 2014/0055348 A1    Feb. 27, 2014

(30) Foreign Application Priority Data

Mar. 31, 2011    (JP) .................................. 2011-077985

(51) Int. Cl.
*G09G 5/00*  (2006.01)
*G06F 3/01*  (2006.01)
*G06F 3/0481*  (2013.01)
*H04N 13/00*  (2006.01)
*H04N 13/04*  (2006.01)
*G06T 3/00*  (2006.01)
*G09G 5/34*  (2006.01)

(52) U.S. Cl.
CPC .............. *G06F 3/017* (2013.01); *G06F 3/0481* (2013.01); *G06T 3/00* (2013.01); *G09G 5/346* (2013.01); *H04N 13/0014* (2013.01); *H04N 13/0468* (2013.01); *G06F 2203/04802* (2013.01); *G06T 2200/16* (2013.01); *G09G 2354/00* (2013.01)

(58) Field of Classification Search
CPC .................. G06F 3/017; G06F 3/0481; G06F 2203/04802; G06T 3/00; G06T 2200/16; G09G 5/346; G09G 2354/00; H04N 13/0014; H04N 13/0468
USPC ................. 345/421, 422, 607, 623, 156, 582; 715/757, 848
See application file for complete search history.

(56) References Cited

U.S. PATENT DOCUMENTS

| | | | |
|---|---|---|---|
| 2004/0113915 A1* | 6/2004 | Ohtsuki et al. ................ | 345/582 |
| 2010/0064259 A1* | 3/2010 | Alexanderovitc et al. .... | 715/852 |
| 2011/0131502 A1* | 6/2011 | Ryu et al. ...................... | 715/744 |
| 2012/0013553 A1* | 1/2012 | Kim et al. ...................... | 345/173 |
| 2012/0124509 A1 | 5/2012 | Matsuda et al. | |

FOREIGN PATENT DOCUMENTS

| | | |
|---|---|---|
| JP | 2001-224046 A | 8/2001 |
| JP | 2010-136300 A | 6/2010 |
| JP | 2011-028309 A | 2/2011 |

* cited by examiner

*Primary Examiner* — Kent Chang
*Assistant Examiner* — Nelson Rosario
(74) *Attorney, Agent, or Firm* — Lerner, David, Littenberg, Krumholz & Mentlik, LLP

(57) ABSTRACT

According to an illustrative embodiment an information processing apparatus is provided. The apparatus includes a processor for controlling the displaying of a display object including a main display and an attached information display, and for controlling changing a display state of the attached information display based on movement of a viewer.

14 Claims, 28 Drawing Sheets

Fig. 10

300 SWITCHING INFORMATION

| DISPLAY OBJECT | | 001 |
|---|---|---|
| FORM | | DEEP WINDOW |
| SIZE | | MEDIUM |
| POSITION | | x1, y1, z1 |
| ORIENTATION | | dx1, dy1, dz1 |
| DISPLAY CONTENT IN EACH ZONE | ZONE a | MAIN DISPLAY |
| | ZONE b | ATTRIBUTE DISPLAY |
| | ZONE c | OPERATION DISPLAY |
| | ... | ... |
| | ZONE n | — |

INFORMATION PROCESSING APPARATUS, IMAGE DISPLAY APPARATUS, AND INFORMATION PROCESSING METHOD

CROSS-REFERENCE TO RELATED APPLICATION

The present application is a national phase entry under 35 U.S.C. §371 of International Application No. PCT/JP2012/001076 filed Feb. 17, 2012, published on Oct. 4, 2012, as WO 2012/132201 A1, which claims priority from Japanese Patent Application No. JP 2011-077985 filed in the Japanese Patent Office on Mar. 31, 2011.

TECHNICAL FIELD

The present disclosure relates to an information processing apparatus, an image display apparatus, and an information processing method.

BACKGROUND ART

In the past, in a desktop environment such as on a PC (Personal Computer), three-dimensional (3D) visual effects, such as adding shadows to windows and the like displayed on a display screen, have been applied to heighten the user's visual experience.

With modern display technology, it has become possible to achieve a 3D effect using binocular parallax, as with a 3D image display apparatus. With such display technology as the background, an information processing apparatus that disposes virtual objects outside the display region of a display screen not only to achieve a visual effect for the user but also to improve processing efficiency has been proposed (see, for example, PTL1).

CITATION LIST

Patent Literature

[PTL 1]
  JP2011-28309A

SUMMARY

Technical Problem

However, the proposed information processing apparatus cannot be said to provide sufficient operability to improve the processing efficiency for the user, and there is demand for a greater improvement in operability.

The present disclosure aims to provide a novel and improved information processing apparatus, an image display apparatus, and an information processing method that are capable of improving the processing efficiency for the user.

Solution to Problem

According to an illustrative embodiment of the present technology, an information processing apparatus is provided. The apparatus includes a processor for controlling the displaying of a display object including a main display and an attached information display, and for controlling changing a display state of the attached information display based on movement of a viewer.

Advantageous Effects of Invention

According to the information processing apparatus, image display apparatus, and information processing method described herein, it is possible to improve the processing efficiency for the user.

BRIEF DESCRIPTION OF DRAWINGS

FIG. 10 is a diagram showing one example of switching information according to the second embodiment.

DESCRIPTION OF EMBODIMENTS

Figure 1:
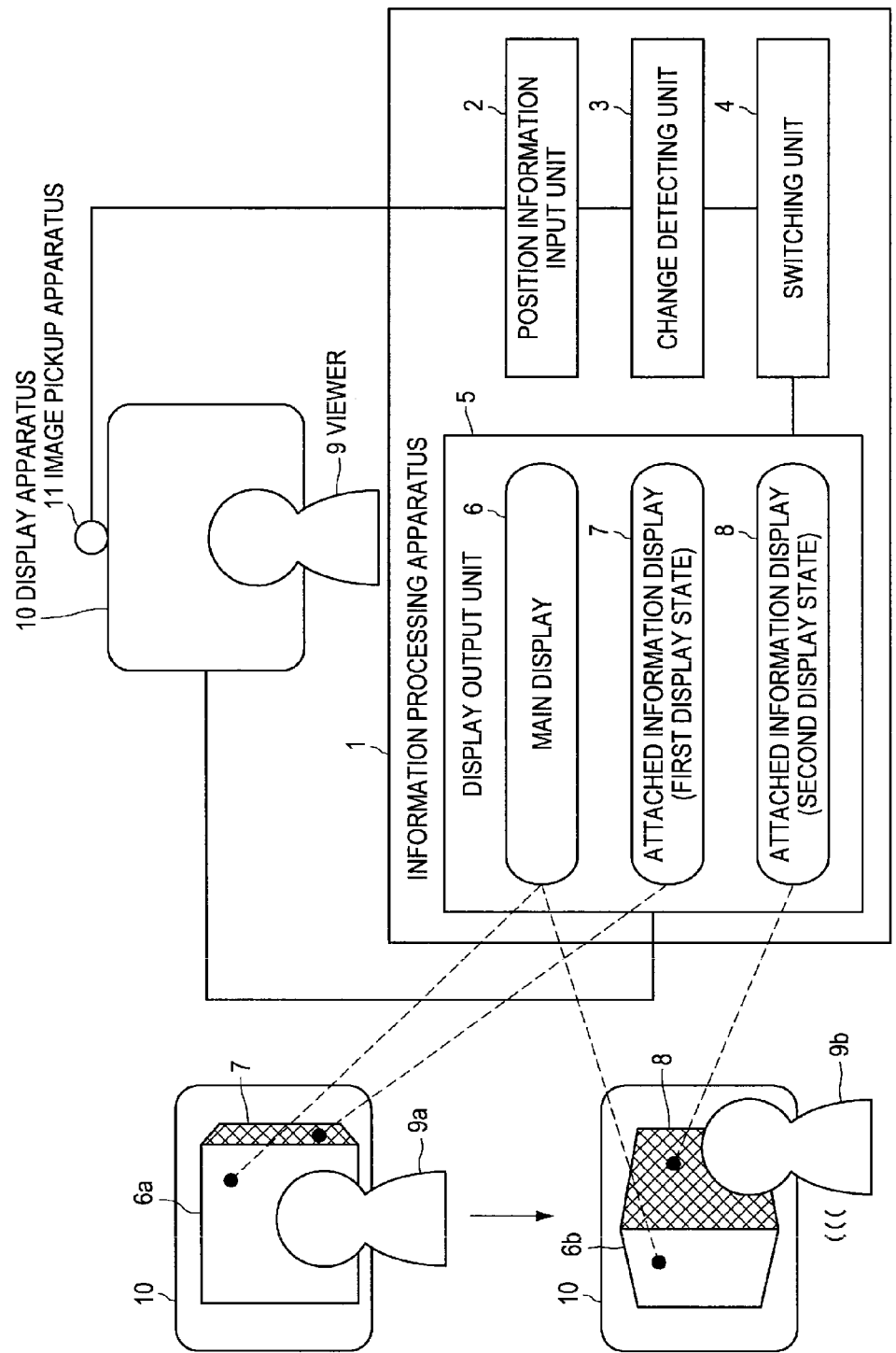
FIG. 1 is a diagram showing an example configuration of an information processing apparatus according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

First Embodiment

First, the configuration of an information processing apparatus according to a first embodiment of the present disclosure will be described with reference to FIG. 1. FIG. 1 is a diagram showing an example configuration of an information processing apparatus according to a first embodiment.

An information processing apparatus 1 generates a display content to be displayed on a display apparatus 10, and outputs a 3D image capable of being viewed by a viewer according to binocular parallax to the display apparatus 10, which is a 3D image display apparatus. The information processing apparatus 1 detects the position of the viewer 9 from an image of the viewer 9 picked up by an image pickup apparatus 11. The information processing apparatus 1 updates the display content displayed on the display apparatus 10 in accordance with the position of the viewer 9.

The information processing apparatus 1 includes a position information input unit 2, a change detecting unit 3, a switching unit 4, and a display output unit 5.

The display output unit 5 outputs a main display 6 and attached information displays 7, 8, which display attached information relating to the main display 6, to the display apparatus 10. The main display 6 is the display that is principally presented to the viewer 9. In more specific terms, the main display 6 is a display that is principally presented to the viewer 9 using a display object disposed in a virtual space (a virtual 3D space). The attached information displays 7, 8 are displays presented to the viewer 9 as attached information relating to the main display 6, that is, subordinately to the main display 6. The attached information displays 7, 8 are displays presented to the viewer 9 subordinately to the main display 6 using a display object disposed in the virtual space.

The attached information display 7 is an attached information display for a first display state, and the attached information display 8 is attached information display for a second display state that is easier for the viewer to view compared to the first display state. Compared to the attached information display 7, the attached information display 8 is an easy-to-view display state due to one or a combination of enlargement of the display area, a change in the display orientation, a change in brightness, and the like. Note that it is assumed that the display state of the attached information display 7 includes a non-displayed state.

The position information input unit 2 inputs position information for the viewer 9 viewing the display apparatus 10. The position information is information capable of specifying the position of the viewer 9 based on the image picked up by the image pickup apparatus 11. As examples, the image pickup apparatus 11 is a CCD image sensor (Charge Coupled Device Image Sensor) or a CMOS image sensor (Complementary Metal Oxide Semiconductor Image Sensor).

The change detecting unit 3 detects a change in the position information. For example, the change detecting unit 3 compares the position information of a viewer 9a at a first position and the position information of a viewer 9b at a second position and detects that there has been a change in the position information of the viewer 9.

Based on the detection of the change in the position information of the viewer 9, the switching unit 4 switches the display state of the attached information display from the first display state to the second display state that is easy for the viewer to view compared to the first display state.

For example, the information processing apparatus 1 has the display apparatus 10 display and output a main display 6a on a front surface of a window display composed of a rectangular solid and the attached information display 7 on a side surface to the viewer 9a. Here, when the position information input unit 2 inputs the position information of the viewer 9b and the change detecting unit 3 detects a change in position from the viewer 9a to the viewer 9b, the switching unit 4 switches the attached information display 7 outputted by the display output unit 5 to the attached information display 8. That is, the information processing apparatus 1 has the display apparatus 10 output and display the attached information display 8 on the front surface of the window display composed of a rectangular parallelepiped and the main display 6b on the side surface to the viewer 9b.

In this way, the information processing apparatus 1 is capable of detecting a change in position of the viewer 9 and switching the attached information display 7 to the attached information display 8. By doing so, the viewer 9 who views the display apparatus 10 is capable of easily switching the display content by changing his/her own position, which makes it possible to improve the processing efficiency for the viewer (user) 9.

Also, since the information processing apparatus 1 detects a change in position of the viewer 9 and switches the display content of the display apparatus 10 that is a 3D image display apparatus, it is possible to provide operations that feel natural to the viewer 9.

Second Embodiment

Figure 2:
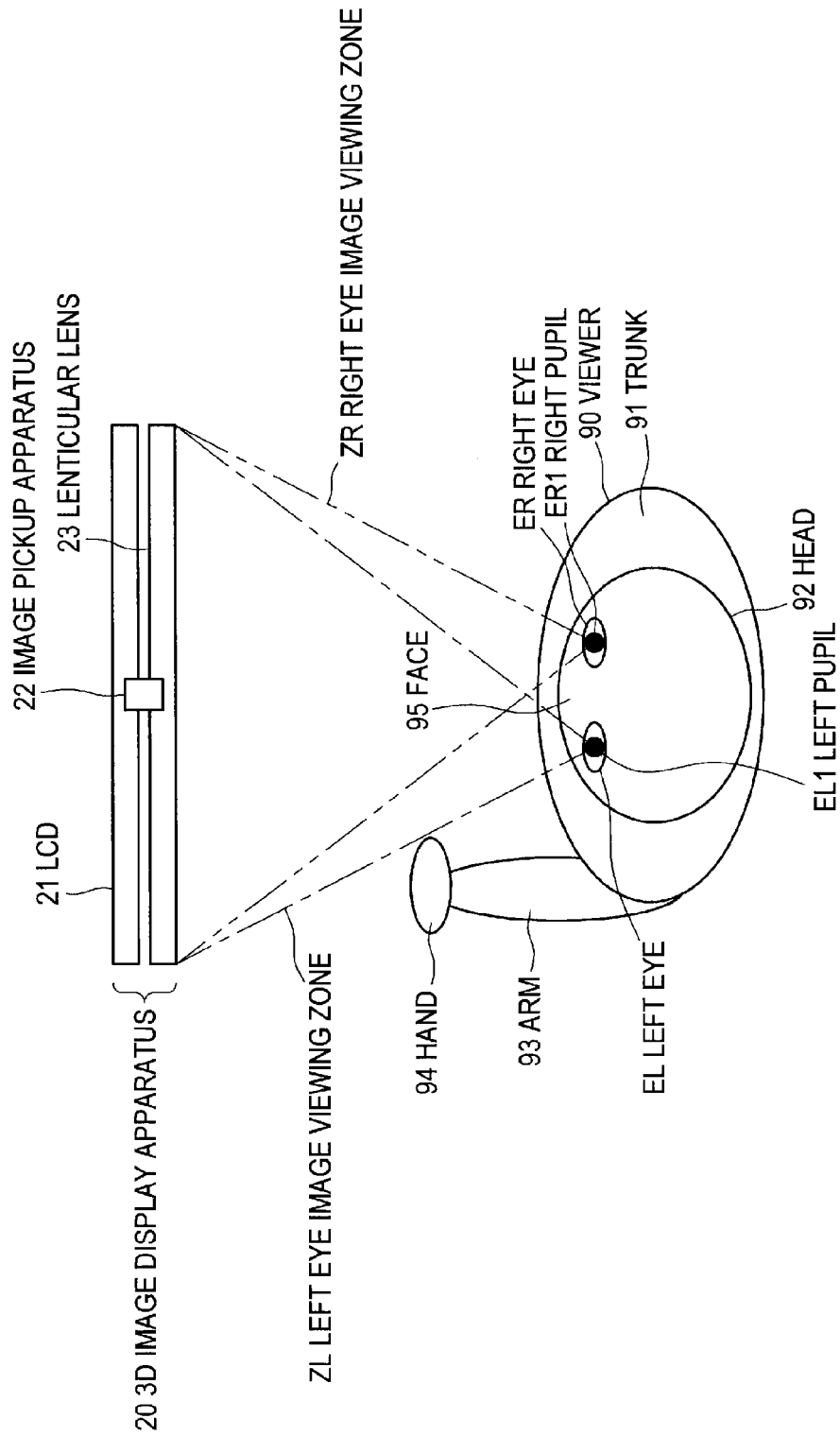
FIG. 2 is a diagram showing the relationship between a 3D image display apparatus and a viewer according to a second embodiment.

Next, another specific example will be described by way of a second embodiment. FIG. 2 is a diagram showing the relationship between the 3D image display apparatus and the viewer according to the second embodiment.

The 3D image display apparatus 20 displays a 3D image that a viewer 90 can view due to binocular parallax. The 3D image display apparatus 20 includes an LCD (Liquid Crystal Display) 21 and a lenticular lens 23. The LCD 21 displays a left-eye image and a right-eye image. The lenticular lens 23 refracts incident light from the LCD 21 and outputs a left-eye image displayed by the LCD 21 to a left-eye image viewing zone ZL and a right-eye image displayed by the LCD 21 to a right-eye image viewing zone ZR. By doing so, the 3D image display apparatus 20 makes the left-eye image and the right-eye image visible to the left eye EL and the right eye ER (which are around 65 mm apart) respectively of the viewer 90 who is a specified distance from the display screen of the 3D image display apparatus 20.

The left-eye image and the right-eye image are images for which parallax has been set, so that the viewer 90 is capable of recognizing the images displayed on the 3D image display apparatus 20 as a 3D image.

The 3D image display apparatus 20 includes an image pickup apparatus 22 on a frame portion or a peripheral edge portion of the display screen. The image pickup apparatus 22 picks up images of the viewer 90. The images picked up by the image pickup apparatus 22 specify the position of the viewer 90 and are used to detect a change in such position. The images picked up by the image pickup apparatus 22 are not limited to being used to detect a change in position and can also be used for gesture input.

Note that the image pickup apparatus 22 may pick up an image of the viewer 90's whole body or just one part or a plurality of parts of the body. For example, image pickup is carried out for the trunk 91 of the viewer 90 when body tracking is carried out. Similarly, image pickup is carried out for the head 92 of the viewer 90 when head tracking is carried out. Image pickup is carried out for the arm 93 and hand 94 of the viewer 90 when arm tracking or hand tracking is carried out. Image pickup is carried out for the face 95 of the viewer 90 when face tracking is carried out. Image pickup is carried out for the left eye EL, the left pupil EL1 the right eye ER, and the right pupil ER1 when eye tracking (including line of sight detection) is carried out.

Note that although a lenticular-type device has been described as the 3D image display apparatus, the present disclosure is not limited to this and it is also possible to use a known 3D image display method, such as a space-division method using a barrier or the like, or a time-division method using shutter glasses.

Figure 3:
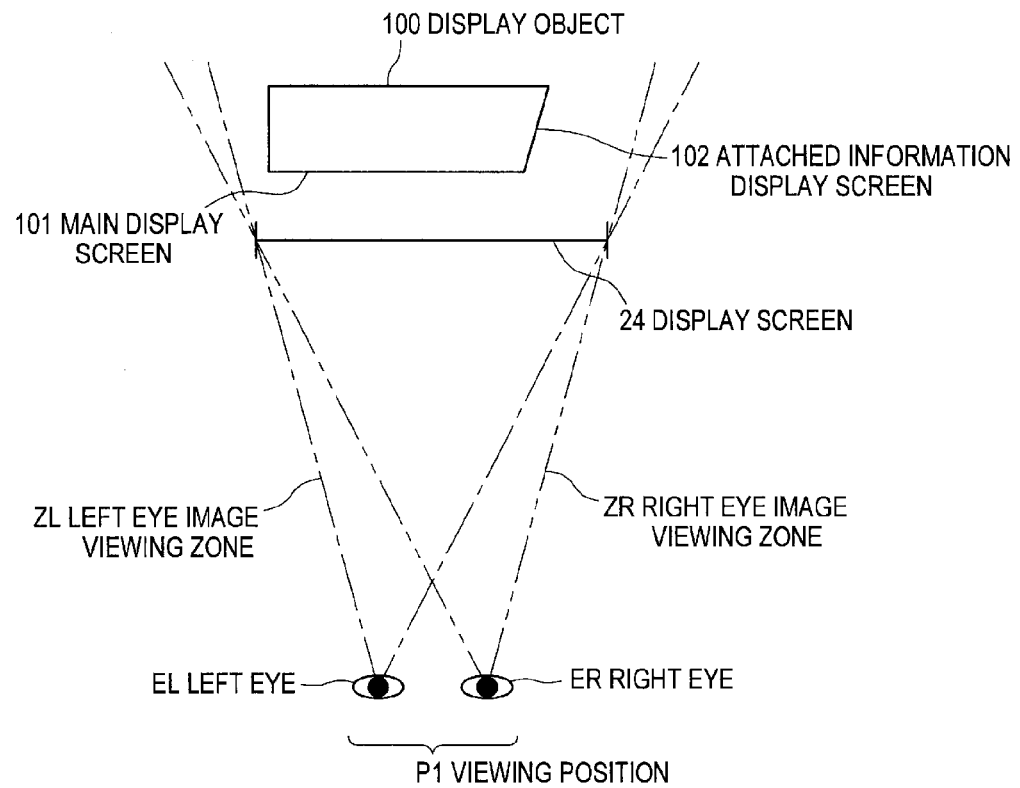
FIG. 3 is a diagram showing the relationship between a display object and a viewer when the viewer is directly facing a display screen according to the second embodiment.
Figure 4:
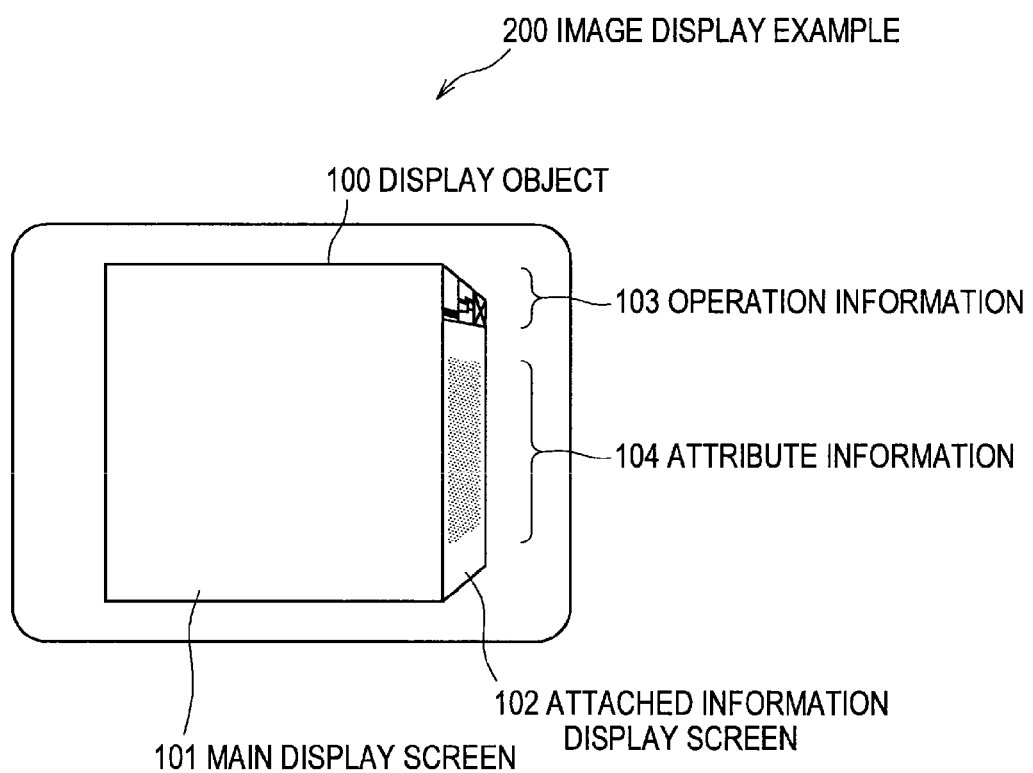
FIG. 4 is a diagram showing an image display example when the viewer is directly facing the display screen according to the second embodiment.
Figure 5:
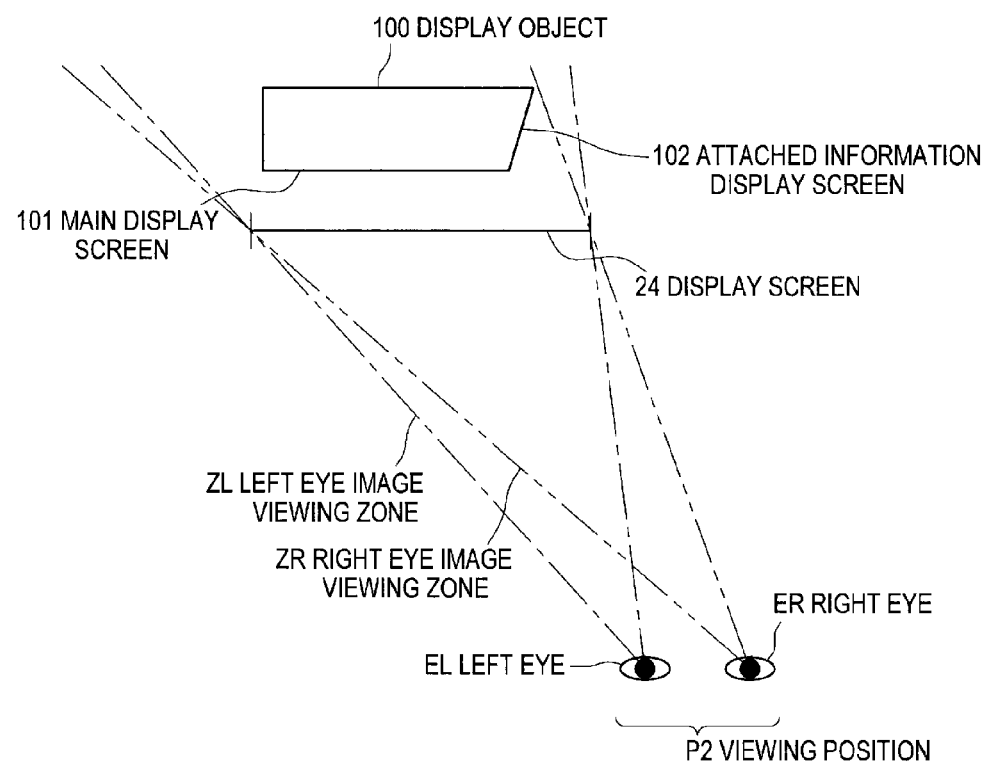
FIG. 5 is a diagram showing the relationship between a display object and the viewer when the viewer is directly facing the display screen according to the second embodiment.
Figure 6:
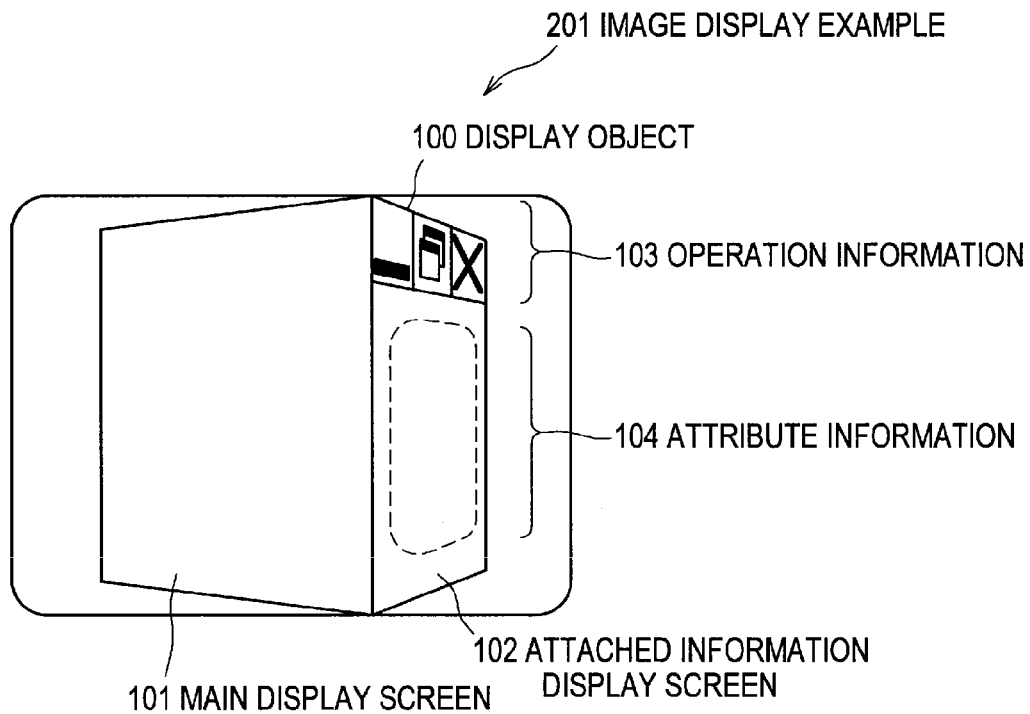
FIG. 6 is a diagram showing an image display example when the viewer is not directly facing the display screen according to the second embodiment.
Figure 7:
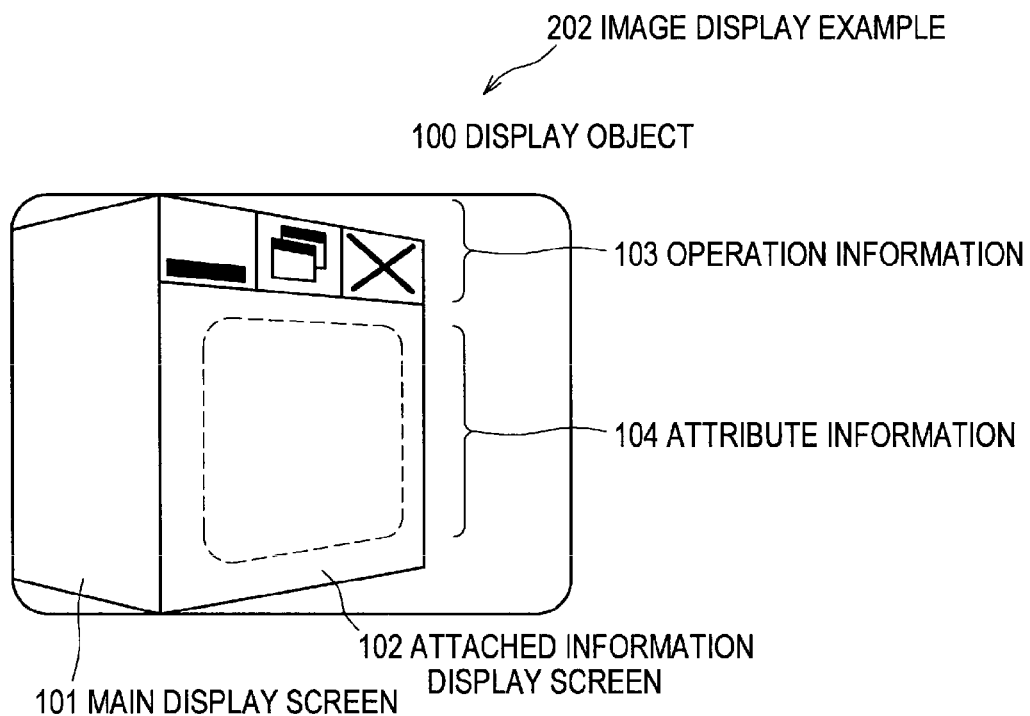
FIG. 7 is a diagram showing an image display example when the viewer is not directly facing the display screen according to the second embodiment.

Next, the display objects displayed by the 3D image display apparatus will be described with reference to FIG. 3 to FIG. 7 showing image display examples for when the viewer 90 is directly facing the display screen and not directly facing the display screen. FIG. 3 is a diagram showing the relationship between a display object and the viewer when the viewer is directly facing the display screen according to the second embodiment. FIG. 4 is a diagram showing an image display example for when the viewer is directly facing the display screen according to the second embodiment. FIG. 5 is a diagram showing the relationship between a display object and the viewer when the viewer is not directly facing the display screen according to the second embodiment. FIG. 6 and FIG. 7 are diagrams showing image display examples for when the viewer is not directly facing the display screen according to the second embodiment.

Based on the left-eye image and the right-eye image displayed on a display screen 24 of the 3D image display apparatus 20, an image (which the viewer 90 can view as a 3D image) appearing in a virtual space formed behind and in front of the plane of the display screen 24 represents a display object. When the left eye EL and the right eye ER of the viewer 90 are at a viewing position P1, that is, when the left eye EL is in the left-eye image viewing zone ZL and the right eye ER is in the right-eye image viewing zone ZR, the viewer 90 is capable of viewing the display object 100 as a 3D image.

The display object 100 is set as a polyhedron including a main display screen 101 and an attached information display screen 102. The display object 100 is a given display unit for information and as one example may be a window or an icon.

The main display screen 101 of the display object 100 is the main display screen of the display object 100, and the attached information display screen 102 is a subordinate display displaying attached information that is subordinate to the main display. The main display screen 101 shown in FIG. 3 is at a position that is easy to view for the viewer 90 at the viewing position P1 compared to the attached information display screen 102. The main display screen 101 is at a position that directly faces the viewer 90 at the viewing position P1. The main display screen 101 displays a mid-execution screen of an application. As examples, the main display screen 101 is an editing screen of a word processor, a text editor, or a graphic editor, or a browsing screen of a browser.

An image display example 200 is an image seen when the display object 100 disposed in the virtual space is viewed from the viewing position P1. The display object 100 shown in the image display example 200 is a window of an application and displays the main display screen 101 so as to directly face the front and displays the attached information display screen 102 on one side surface. The display object 100 is a trapezoidal shape when the virtual space is viewed from above, and the viewer 90 at the viewing position P1 can confirm the presence of the attached information display screen 102. In this way, the attached information display screen 102 that can be viewed together with the main display screen 101 motivates the viewer 90 at the viewing position P1 to change his/her viewing position.

The attached information display screen 102 displays operation information 103 and attribute information 104. The operation information 103 is information relating to operations of the application. For example, the operation information 103 is operation menu items such as "minimize", "maximize" and "close" for a window and operation menu items such as "save" and "print" for a file. The attribute information 104 is information relating to attributes of the application. For example, the attribute information 104 is "date created", "date updated", "size", "created by", "updated by", and the like for a file being worked on.

Also, even if the display object 100 is an icon, the attached information display screen 102 can display the operation information 103 and/or the attribute information 104 in the same way as with the window of an application.

The viewing position P2 shown in FIG. 5 is positioned to the right of the viewing position P1. The main display screen 101 is at a position displaced from a position directly facing the viewer 90 at the viewing position P2. Based on the detection of the change in position of the viewer 90 from the viewing position P1 to the viewing position P2, the 3D image display apparatus 20 switches the image displayed on the display screen 24 as in the image display example 201 shown in FIG. 6. Also, at the viewing position P2, the lenticular lens 23 refracts the incident light from the LCD 21 and outputs the left-eye image displayed on the LCD 21 to the left-eye image viewing zone ZL and the right-eye image displayed on the LCD 21 to the right-eye image viewing zone ZR.

The image display example 201 is an image where the display object 100 positioned in the virtual space is viewed from the viewing position P2. The attached information display screen 102 of the display object 100 shown in the image display example 201 has a larger display area than the attached information display screen 102 shown in the image display example 200. By doing so, it becomes easy for the viewer 90 to view the information (the operation information 103, the attribute information 104) displayed on the attached information display screen 102. The enlargement of the display area of the attached information display screen 102 can be realized by switching a virtual viewpoint for viewing the display object 100 from the viewing position P1 to the viewing position P2.

An image display example 202 shown in FIG. 7 is an image seen when the display object 100 disposed in the virtual space is viewed from the viewing position P2. The attached information display screen 102 of the display object 100 shown in the image display example 202 has an even larger display area than the attached information display screen 102 shown in the image display example 201. By doing so, it is much easier for the viewer 90 to view the information (the operation information 103, the attribute information 104) displayed on the attached information display screen 102.

Note that aside from switching the virtual viewpoint for viewing the display object 100, the enlargement of the display area of the attached information display screen 102 can be realized by changing one or a combination of the orientation, size, and shape of the display object 100.

Figure 8:
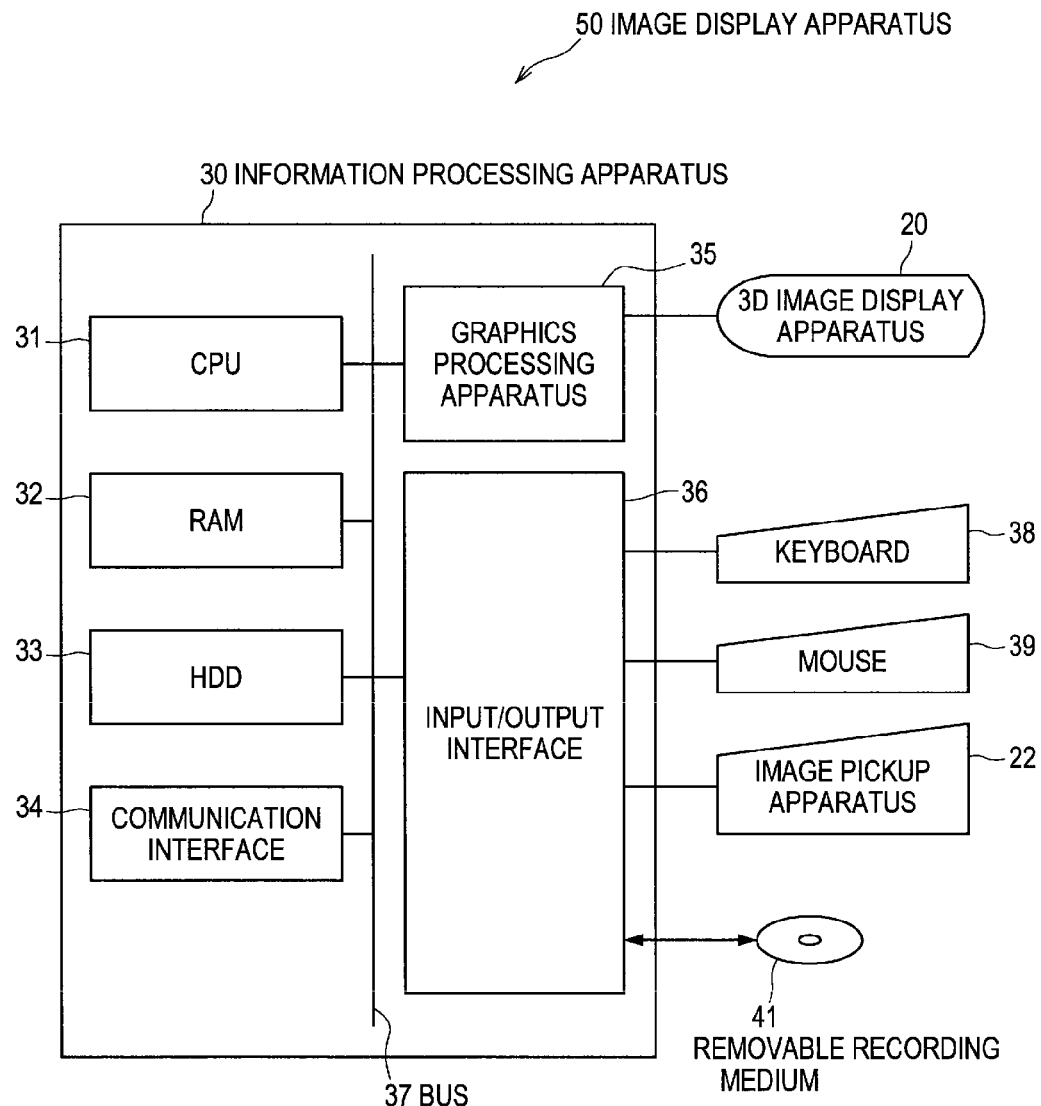
FIG. 8 is a diagram showing an example hardware configuration of an image display apparatus according to the second embodiment.

Next, the hardware configuration of an image display apparatus will be described. FIG. 8 is a diagram showing an example hardware configuration of the image display apparatus according to the second embodiment. The image display apparatus 50 includes an information processing apparatus 30, which carries out information processing including image processing, and the 3D image display apparatus 20, which is capable of displaying and outputting images generated by the information processing apparatus 30 as 3D images.

The entire information processing apparatus 30 is controlled by a CPU (Central Processing Unit) 31. The CPU 31 is connected via a bus 37 to a RAM (Random Access Memory) 32, an HDD (Hard Disk Drive) 33, a communication interface 34, a graphics processing apparatus 35, and an input/output interface 36.

The RAM 32 temporarily stores at least part of an OS (Operating System) program to be executed by the CPU 31, an application program for execution by a server, and the like. The RAM 32 also stores various data for processing by the CPU 31. The HDD 33 stores the OS, application programs, and the like.

The graphics processing apparatus 35 is connected to the 3D image display apparatus 20. The 3D image display apparatus 20 displays a specified GUI (Graphical User Interface) for performing information processing tasks. The graphics processing apparatus 35 has the 3D image display apparatus 20 display images in accordance with instructions from the CPU 31.

The input/output interface 36 is connected to a keyboard 38, a mouse 39, and the image pickup apparatus 22. The input/output interface 36 is also capable of connecting to a removable recording medium interface that is capable of writing information onto a removable recording medium 41 and reading information from the removable recording medium 41. The input/output interface 36 transmits signals sent from the keyboard 38, the mouse 39, the image pickup apparatus 22, and the removable recording medium interface via the bus 37 to the CPU 31.

Based on the input from the image pickup apparatus 22, the information processing apparatus 30 carries out tracking and gesture input for the viewer 90. Note that the image display apparatus 50 may be provided with both an input apparatus that performs tracking of the viewer 90 and an input apparatus that performs gesture input.

The communication interface 34 is connected to a network, not shown. The communication interface 34 transmits and receives data to and from another computer via the network.

According to the hardware configuration described above, it is possible to realize the processing function of the present embodiment.

Note that the information processing apparatus 30 can be configured so as to include a module such as an FPGA (Field Programmable Gate Array) and/or a DSP (Digital Signal Processor) and can also be configured so as to not include the CPU 31. In such case, the information processing apparatus 30 includes nonvolatile memory (for example, EEPROM (Electrically Erasable and Programmable Read Only Memory), flash memory, a flash memory-type memory card or the like) and stores the firmware of the module(s). Such firmware can be written into the nonvolatile memory via the removable recording medium 41 or the communication interface 34. By rewriting the firmware written in the nonvolatile memory, it is also possible to update the firmware of such information processing apparatus 30.

Figure 9:
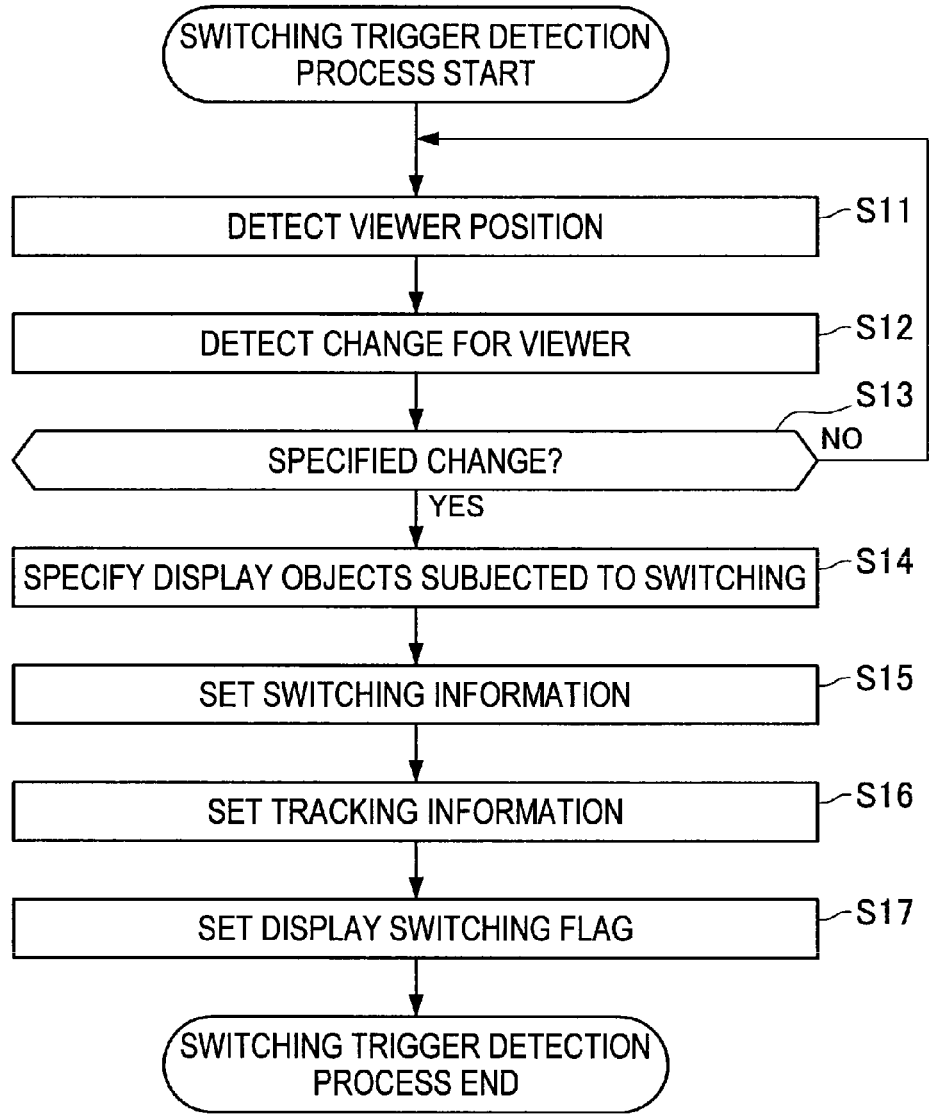
FIG. 9 is a flowchart of a switching trigger detection process according to the second embodiment.

Next, a switching trigger detection process executed by the information processing apparatus 30 will be described with reference to FIG. 9 and FIG. 10. FIG. 9 is a flowchart of the switching trigger detection process according to the second embodiment. FIG. 10 is a diagram showing one example of switching information according to the second embodiment. The information processing apparatus 30 executes the switching trigger detection process in parallel with execution of an application. The switching trigger detection process carries out tracking of the viewer 90, decides the timing for switching the display, and sets the switched-to content.

Step S11

Based on an input from the image pickup apparatus 22, the information processing apparatus 30 detects the position of the viewer 90.

Step S12

The information processing apparatus 30 detects a specified change in the position of the viewer 90.

Step S13

If the information processing apparatus 30 has detected a specified change in the position of the viewer 90, the processing proceeds to step S14, but if the specified change has not been detected, the processing returns to step S11.

Step S14

The information processing apparatus 30 specifies a display object to be subjected to switching on the display. Note that there may be a plurality of display objects to be subjected to switching on the display. The display object to be subjected to switching on the display does not need to satisfy a specified condition, such as a window being active.

Step S15

The information processing apparatus 30 sets switching information for each display object specified as a display object to be subjected to switching on the display. Switching information 300 is one example of the switching information set by the information processing apparatus 30. The switching information 300 is information specifying what kind of display state a display object will switch to. The switching information 300 includes identification information (for example, "001") for uniquely identifying a display object. Also, the switching information 300 includes information (for example, "deep window") capable of specifying the shape of a display object. The switching information 300 also includes information (for example, "medium") capable of specifying the size of a display object. The switching information 300 further includes information (for example, "x1, y1, z1") capable of specifying the position of a display object. The switching information 300 also includes information (for example, "dx1, dy1, dz1") capable of specifying the orientation of a display object. Note that such information may be information in which specific values are defined or may be an index or the like for referring to information that is defined in advance.

The switching information 300 also includes a display content for each zone set for a display object. For example, the display object specified by the identification information "001" includes display zones from zone a to zone n, with "main display" set for zone a, "subordinate display" set for zone b, and "operation display" set for zone c. Note that the zones set for a display object may be set for each surface of the display object composed of a polyhedron, may be set by dividing one surface into a plurality of zones, or may be some combination of the two.

Step S16

The information processing apparatus 30 sets tracking information. The tracking information is information relating to the viewing position of the viewer 90.

Step S17

The information processing apparatus 30 sets a display switching flag used as a display switching trigger and ends the switching trigger detection process.

Note that the specified change detected in step S12 is a specified movement (for example, leftward movement of 65 mm (the distance between the left and right eyes)) in a specified direction of a tracked part of the viewer 90 (for example, the head 92, the left eye EL and the right eye ER, or the like).

The specified change detected in step S12 may be a specified inclination or the like of the head 92 (which includes the face 95 and the left eye EL and the right eye ER). Also, the specified change detected in step S12 may be a specified rotation or the like of the head 92 (which includes the face 95 and the left eye EL and the right eye ER). The specified change detected in step S12 may be in the direction of the line of sight detected from the left eye EL and the left pupil EL1 and the right eye ER and the right pupil ER1. By doing so, it is possible to switch the display regardless of whether there has been large movement of the trunk 91, which makes it possible to significantly improve the processing efficiency for the user.

Figure 11:
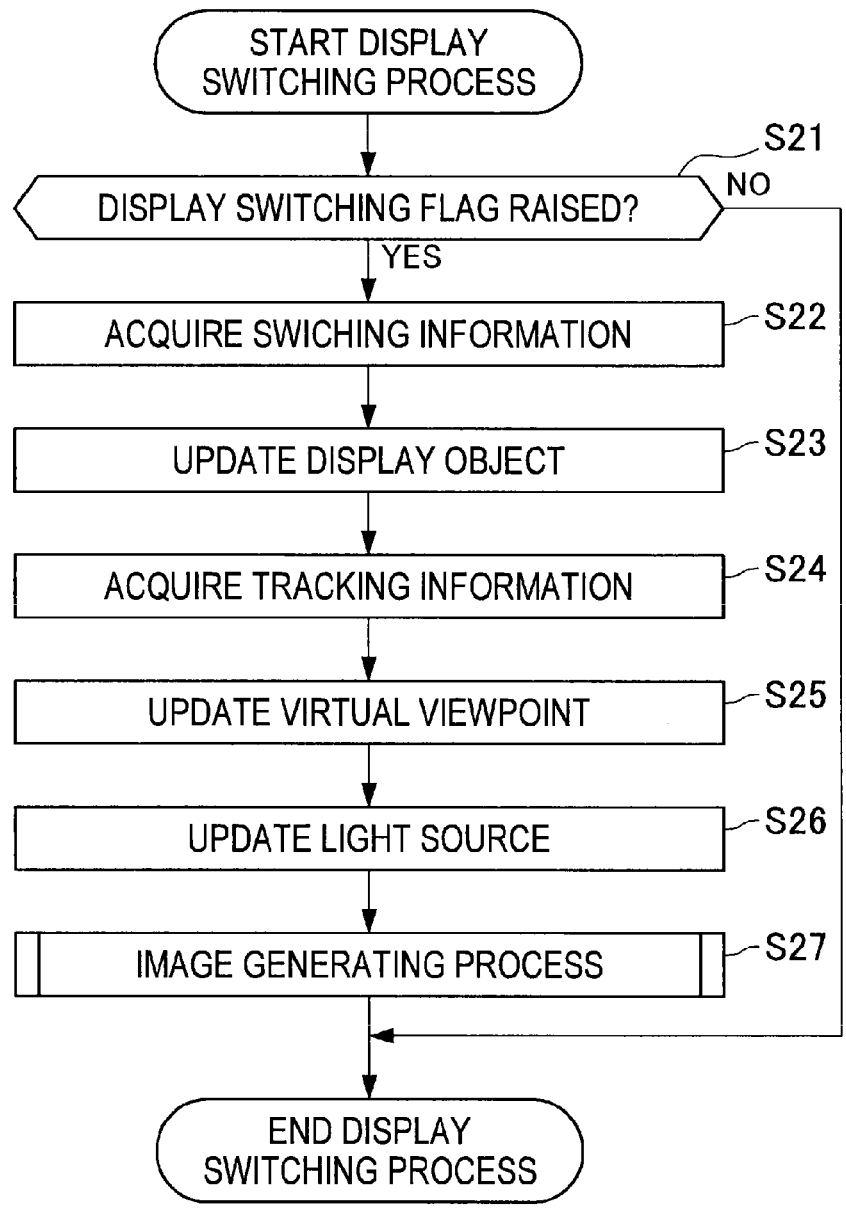
FIG. 11 is a flowchart of a display switching process according to the second embodiment.
Figure 12:
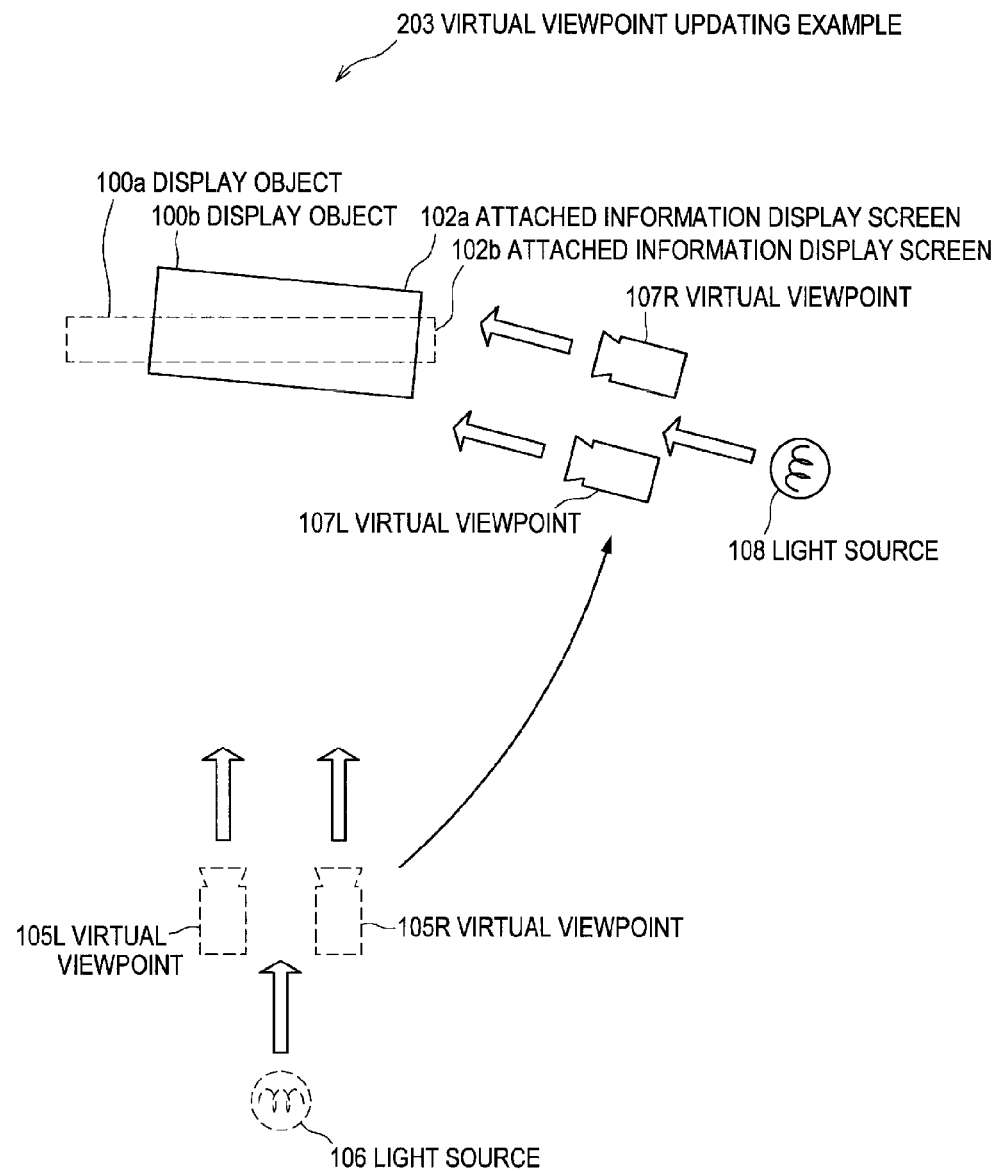
FIG. 12 is a diagram showing how virtual viewpoints and a light source are updated according to the second embodiment.

Next, the display switching process executed by the information processing apparatus 30 will be described with reference to FIG. 11 and FIG. 12. FIG. 11 is a flowchart of the display switching process according to the second embodiment. FIG. 12 is a diagram showing how a virtual viewpoint and a light source are updated according to the second embodiment. The information processing apparatus 30 executes the display switching process in parallel with execution of a application.

The display switching process monitors the display switching flag set by the switching trigger detection process, detects whether the display switching flag has been set, and carries out display switching.

Step S21

The information processing apparatus 30 monitors the display switching flag and if the display switching flag has been set, the processing proceeds to step S22 and if the display switching flag has not been set, the display switching process ends.

Step S22

The information processing apparatus 30 acquires the switching information.

Step S23

The information processing apparatus 30 updates the display object based on the switching information. For example, based on the switching information 300, the information processing apparatus 30 sets the shape of the display object specified by the identification information "001" at "deep window", the size at "medium", the position at "x1, y1, z1", and the orientation at "dx1, dy1, dz1".

Step S24

The information processing apparatus 30 acquires the tracking information.

Step S25

The information processing apparatus 30 updates the virtual viewpoint set in the virtual space based on the tracking information.

Step S26

The information processing apparatus 30 updates the light source set in the virtual space based on the tracking information.

Step S27

The information processing apparatus 30 executes an image generating process that generates a display image and then ends the display switching process. The image generating process is a process that carries out a rendering process based on the light source and virtual viewpoint set for the display object disposed in the virtual space to generate the display image. The information processing apparatus 30 combines the left eye image and right eye image after generation to generate the display image.

A virtual viewpoint updating example 203 is an example of updating of the display object, the light source, and the virtual viewpoint before and after execution of the display switching process. The virtual viewpoint updating example 203 shows the positional relationship between the display objects 100a, 100b, the light sources 106, 108, and the virtual viewpoints 105L, 105R, 107L, 107R before and after display switching. Note that the virtual viewpoints 105L, 107L are virtual viewpoints for generating left-eye images and the virtual viewpoints 105R, 107R are virtual viewpoints for generating right-eye images.

The display object 100a before display switching is switched based on the switching information to the display object 100b for which the shape, size, position, and orientation of the display object have been updated. Also, the light source 106 before display switching is switched to the light source 108 where the position, range of illumination, brightness, color, and the like have been updated based on the tracking information. Similarly, the virtual viewpoints 105L, 105R before display switching are switched to the virtual viewpoints 107L, 107R where the position, orientation, and the like have been updated based on the tracking information.

When switching the display, the image display apparatus 50 updates the display state of the display object(s) and also updates the layout of the display object(s), the light source, and the virtual viewpoints, so that compared to the attached information display screen 102a, the attached information display screen 102b is easy for the viewer 90 to view.

Note that when switching the display, the image display apparatus 50 may carry out one of updating the display state of the display object(s) and updating the layout of the display object(s), the light source, and the virtual viewpoints.

Note that during the switching to the virtual viewpoints 107L, 107R, when updating the position and orientation based on the tracking information, it is possible to switch the display content with a greater change than the detected movement of the viewer 90, such as by multiplying with a specified coefficient. By doing so, the image display apparatus 50 is capable of improving the visibility of the attached information display screen 102 without forcing the viewer 90 to make a large movement.

Next, a virtual space layout example and an image display example for the display object will be described with reference to FIG. 13 to FIG. 16. FIG. 13 to FIG. 16 are diagrams showing examples of the image display and virtual space layout of a display object according to the second embodiment.

A virtual space layout example 205 (see FIG. 13) shows the state of the display object 110 when the viewer 90 directly faces the display screen 24 (before display switching). The display object 110 is shaped like a thin plate and is positioned behind the plane of the display screen 24. The display object 110 has a main display screen 111 thereof oriented toward the display screen 24 and an attached information display screen 112 oriented toward the side.

Figure 13:
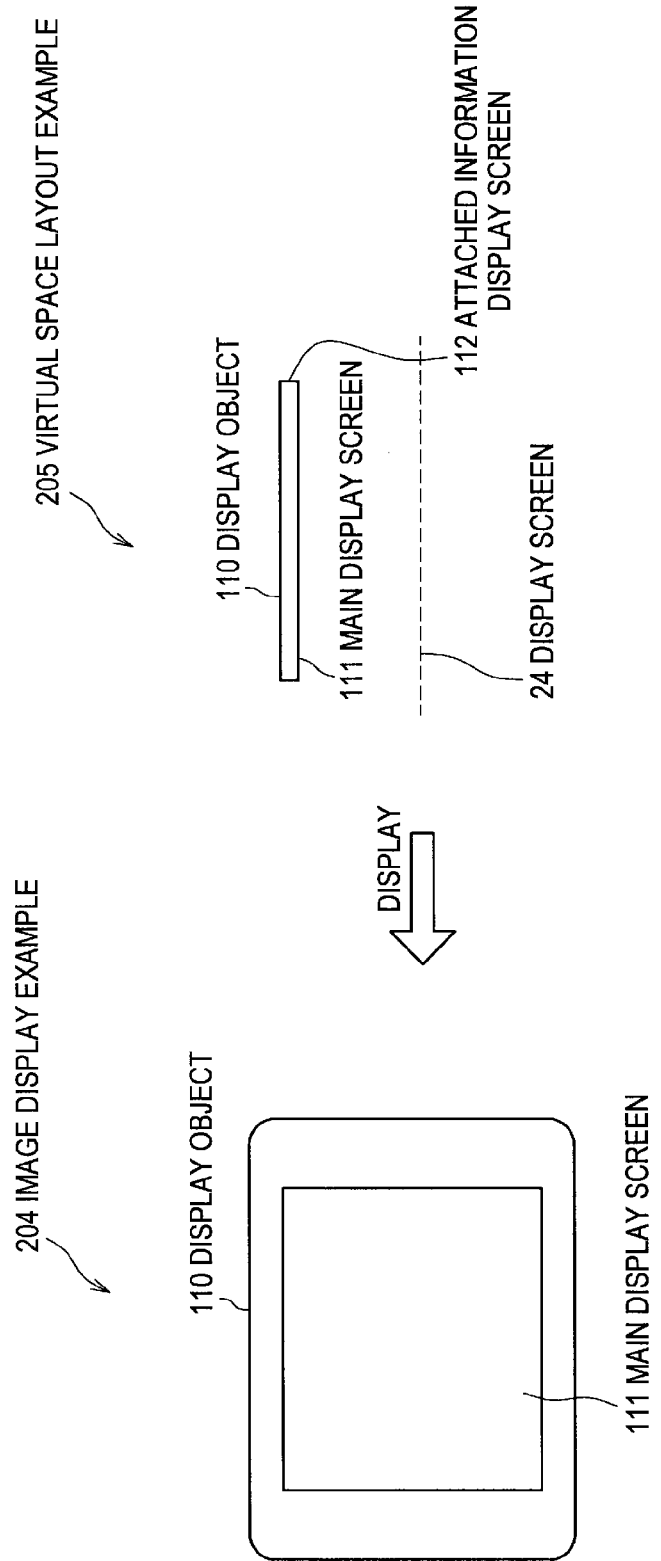
FIG. 13 is a diagram showing one example of an image display and a virtual space layout of a display object according to the second embodiment.

This display object 110 is viewed by the viewer 90 as in an image display example 204 (see FIG. 13). The main display screen 111 of the display object 110 is in an easy-to-view state for the viewer 90 and the attached information display screen 112 is in a non-viewable state.

A virtual space layout example 207 (see FIG. 14) shows the state of a display object 113 when the viewer 90 directly faces the display screen 24 (before display switching). The display object 113 is shaped like a thin plate with a trapezoidal cross section and is positioned behind the plane of the display screen 24. The display object 113 has a main display screen 114 thereof oriented toward the display screen 24 and the attached information display screen 115 oriented toward the front at an angle.

Figure 14:
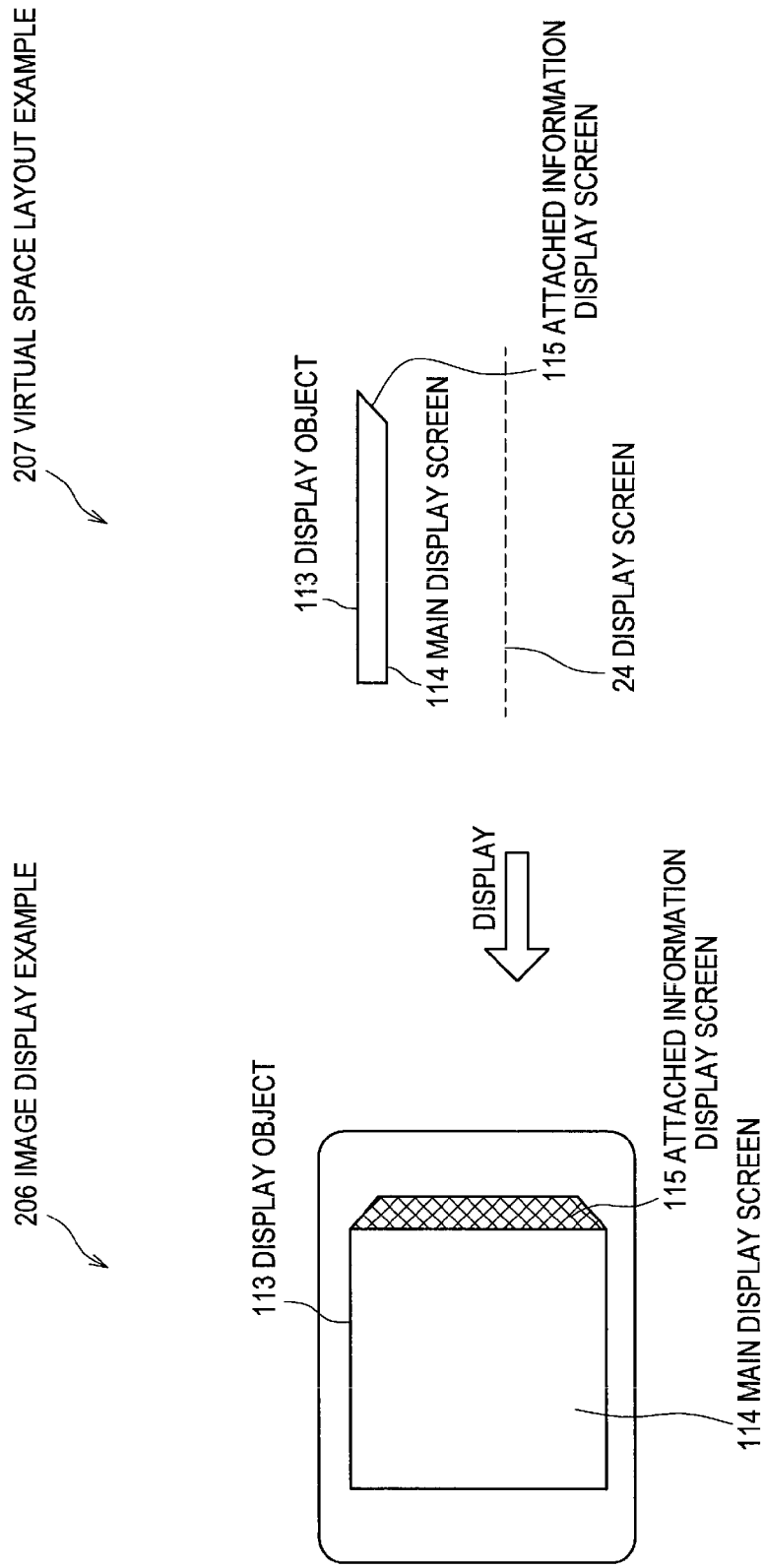
FIG. 14 is a diagram showing one example of an image display and a virtual space layout of a display object according to the second embodiment.

This display object 113 is viewed by the viewer 90 as in an image display example 206 (see FIG. 14). The main display screen 114 of the display object 113 is in an easy-to-view state for the viewer 90 and although the attached information display screen 115 is not easy to view, the presence of the attached information display screen 115 can be confirmed. The attached information display screen 115 motivates the viewer 90 to change position in order to view the attached information display screen 115.

A virtual space layout example 209 (see FIG. 15) shows the state of a display object 116 when the viewer 90 does not directly face the display screen 24 (after display switching). The display object 116 is shaped like a cube and is positioned behind the plane of the display screen 24. A main display screen 117 and an attached information display screen 118 of the display object 116 are oriented toward the front at an angle.

Figure 15:
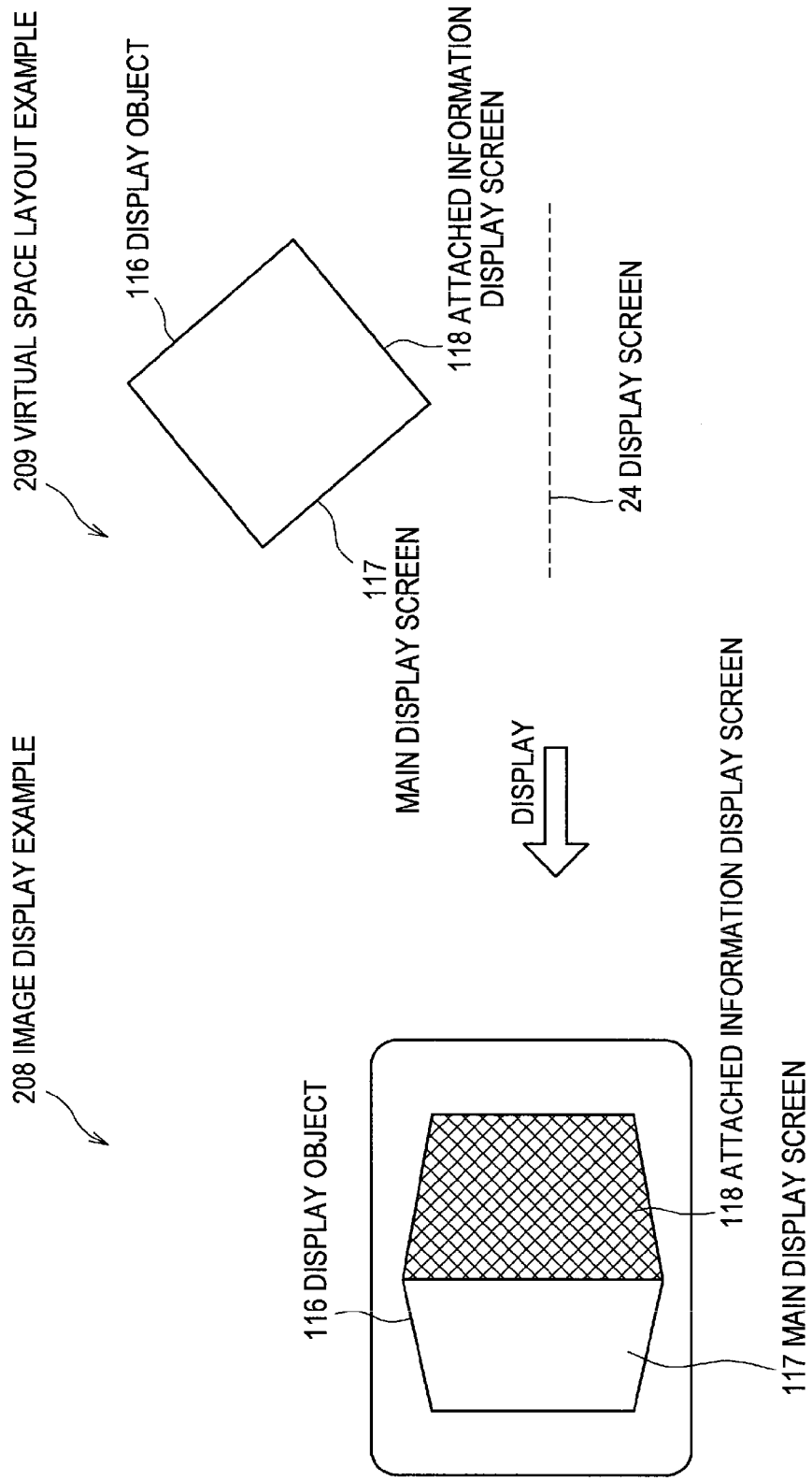
FIG. 15 is a diagram showing one example of an image display and a virtual space layout of a display object according to the second embodiment.

This display object 116 is viewed by the viewer 90 as in an image display example 208 (see FIG. 15). In the display object 116 after display switching, the display state is updated by deformation and/or changing the orientation, and the attached information display screen 118 is placed in a display state that is easy to view for the viewer 90.

Note that if the display object before display switching is the display object 110, the display state of the attached information display screen 118 of the display object 116 can be said to have changed from the non-displayed state of the attached information display screen 112 to a display state that is easy to view for the viewer 90. Also, if the display object before display switching is the display object 113, the attached information display screen 118 of the display object 116 can be said to have changed to a display state that is easier to view for the viewer 90 than the display state of the attached information display screen 115.

A virtual space layout example 211 (see FIG. 16) shows the state of a display object 119 when the viewer 90 does not directly face the display screen 24 (after display switching). The display object 119 is shaped like a cube and is positioned so as to straddle the plane of the display screen 24 with one part in front of the display screen 24 and the remaining part behind the display screen 24. A main display screen 120 and an attached information display screen 121 of the display object 119 are oriented toward the front at an angle.

Figure 16:
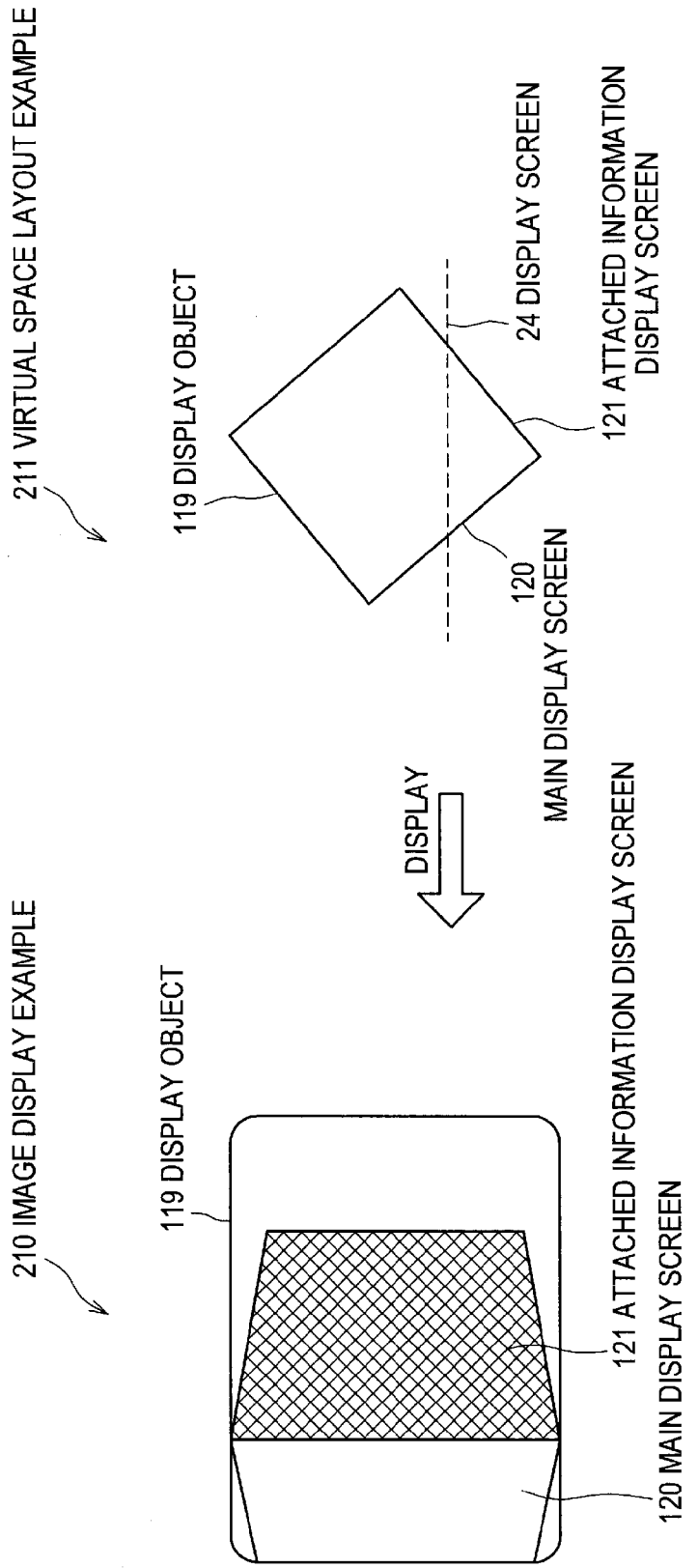
FIG. 16 is a diagram showing one example of an image display and a virtual space layout of a display object according to the second embodiment.

This display object 119 is viewed by the viewer 90 as in an image display example 210 (see FIG. 16). In the display object 119 after display switching, the display state is updated by deformation, changing the orientation, and/or changing the position so that the attached information display screen 121 is placed in a display state that is easy to view for the viewer 90.

Note that if the display object before display switching is the display object 110, the display state of the attached information display screen 121 of the display object 119 can be said to have changed from the non-displayed state of the attached information display screen 112 to a display state that is easy to view for the viewer 90. Also, if the display object before display switching is the display object 113, the attached information display screen 121 of the display object 119 can be said to have changed to a display state that is easier to view for the viewer 90 than the display state of the attached information display screen 115.

In this way, the image display apparatus 50 is capable of changing the ease of viewing the attached information display screen in accordance with movement of the user (the viewer 90). Such improvement in the GUI improves operability for the user and makes effective use of the display region, and therefore makes it possible to improve the processing efficiency of the user.

Figure 17:
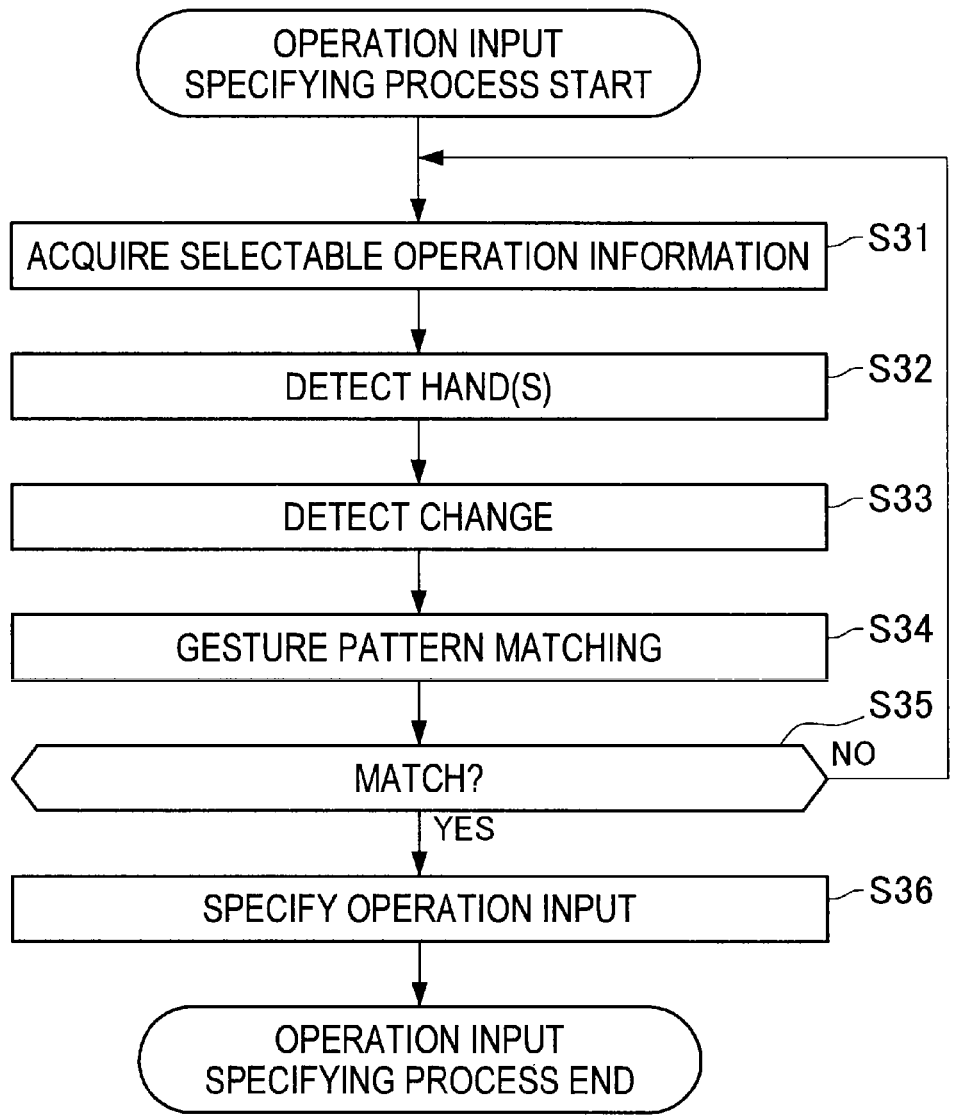
FIG. 17 is a flowchart of an operation input specifying process according to the second embodiment.

Next, an operation input specifying process executed by the information processing apparatus 30 will be described with reference to FIG. 17. FIG. 17 is a flowchart of the operation input specifying process according to the second embodiment. The information processing apparatus 30 executes the operation input specifying process in parallel with execution of an application. The operation input specifying process is a process that detects the hands and/or fingers of the viewer 90, detects a gesture made by the hands and/or fingers, and specifies an operation input for an application.
Step S31

The information processing apparatus 30 acquires selectable operation information. The selectable operation information is information in which gesture patterns that are valid as operation inputs for the application being executed are defined.
Step S32

The information processing apparatus 30 detects the hand(s) 94 of the viewer 90. The information processing apparatus 30 specifies the position, orientation, shape, and the like of the hand(s) 94 of the viewer 90. The detection of the hand(s) 94 of the viewer 90 is carried out based on the images picked up by the image pickup apparatus 22.
Step S33

The information processing apparatus 30 detects changes in the hand(s) 94 of the viewer 90 in a time series.
Step S34

The information processing apparatus 30 carries out matching for the gesture patterns defined by the selectable operation information and a change pattern in the time series for the hand(s) 94 of the viewer 90.

Step S35

If a gesture pattern and the change pattern in the time series for the hand(s) 94 of the viewer 90 match, the information processing apparatus 30 proceeds to step S36, but if there is no match, the information processing apparatus 30 returns to step S31.

Step S36

The information processing apparatus 30 specifies the operation input corresponding to the matched gesture pattern from the selectable operation information and ends the operation input specifying process.

Figure 18:
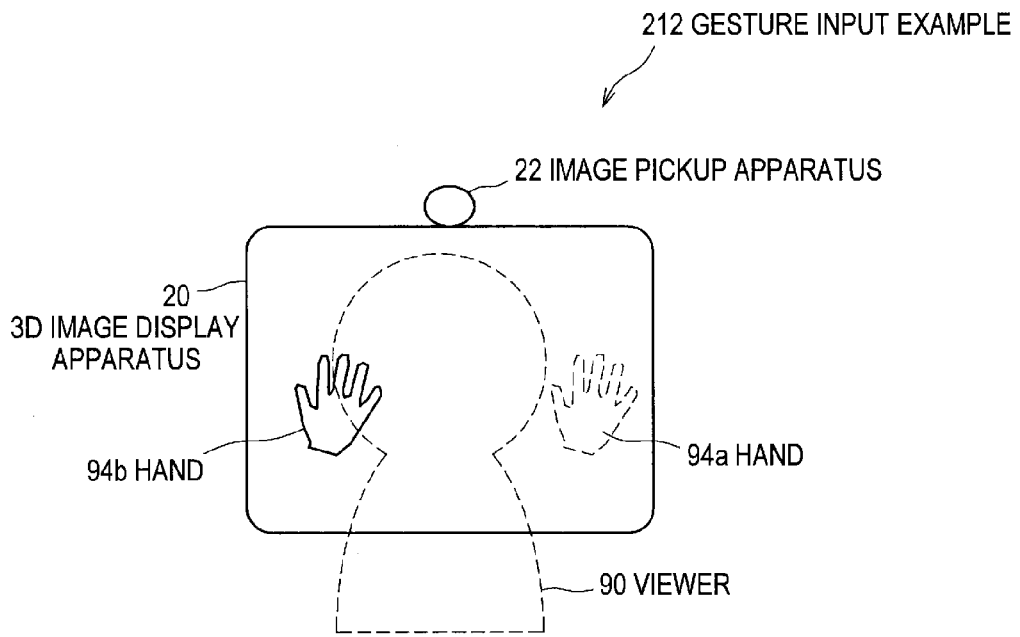
FIG. 18 is a diagram showing one example of gesture input according to the second embodiment.
Figure 19:
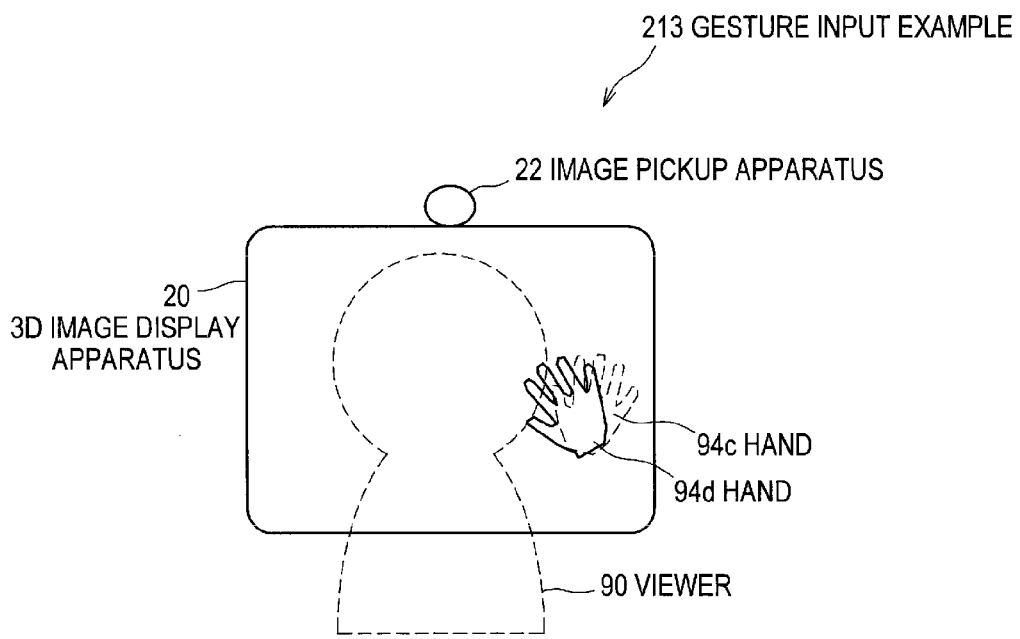
FIG. 19 is a diagram showing one example of gesture input according to the second embodiment.
Figure 20:
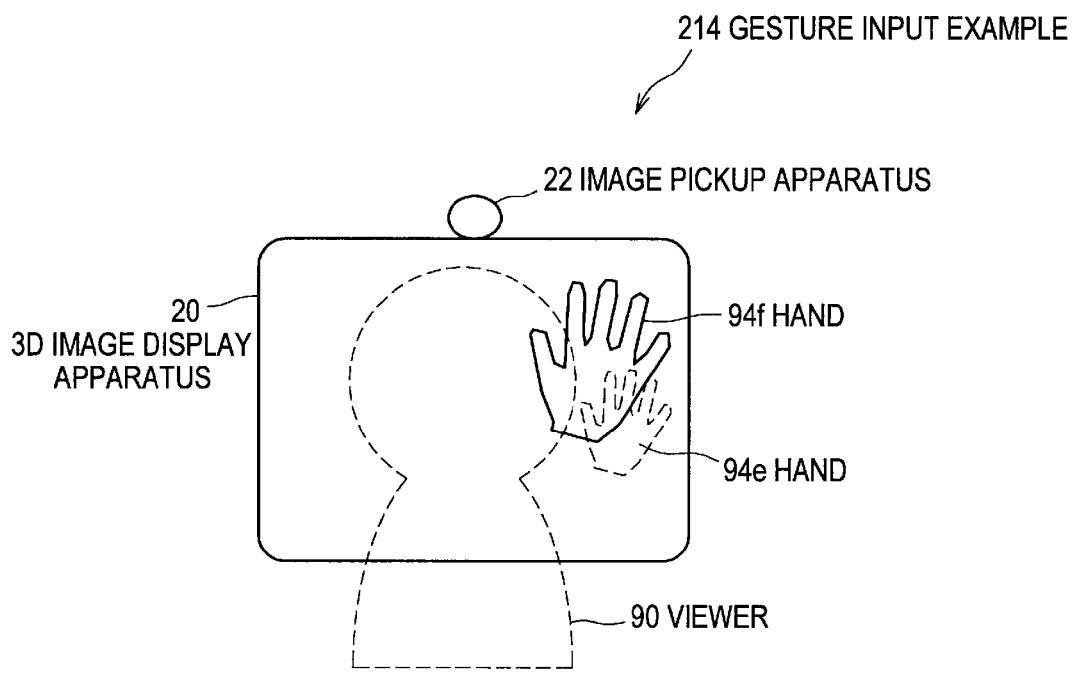
FIG. 20 is a diagram showing one example of gesture input according to the second embodiment.

Next, a specific example of gesture input will be described with reference to FIG. 18 to FIG. 20. FIG. 18 to FIG. 20 are diagrams showing examples of gesture input according to the second embodiment.

A gesture input example 212 shows an example of a gesture input detected when the hand 94a of the viewer 90 has moved to the position of the hand 94b. By detecting the hand 94b after detecting the hand 94a, the information processing apparatus 30 detects whether the change in the hand 94 in a specified time is a specified distance in a specified direction (for example, movement of 20 cm in the leftward direction). Due to the detected change pattern matching a gesture pattern defined in advance, the information processing apparatus 30 receives a specified operation input.

A gesture input example 213 shows an example of a gesture input detected when the hand 94c of the viewer 90 has rotated to the orientation of the hand 94d. By detecting the hand 94c including the positional relationship of the fingers and then detecting rotation through a comparison with the positional relationship of the fingers of the hand 94d, the information processing apparatus 30 detects whether the change in the hand 94 in a specified time is a specified angle in a specified direction (for example, rotation of 30 degrees in the anti-clockwise direction). Due to the detected change pattern matching a gesture pattern defined in advance, the information processing apparatus 30 receives a specified operation input.

A gesture input example 214 shows an example of a gesture input detected when the hand 94e of the viewer 90 has moved close to the position of the hand 94f. By detecting the hand 94f after detecting the hand 94e, the information processing apparatus 30 detects whether the change in the hand 94 in a specified time is a specified distance in a specified direction (for example, movement of 10 cm toward the 3D image display apparatus 20). Due to the detected change pattern matching a gesture pattern defined in advance, the information processing apparatus 30 receives a specified operation input.

Note that aside from the illustrated examples described above, the gesture input may be detection of a change in inclination (for example, a change in the orientation of the palm of the hand) or a change in shape (for example, clenching the fist and/or opening the hand).

Note that although gesture inputs made by the hand 94 have been described, the part of the body which makes the gesture input is not limited to the hand 94 and may be another part of the viewer 90's body (such as the head 92 and/or the face 95). Also, gesture input includes input of the line of sight or the like produced by detecting movement of the left pupil EL1 and/or the right pupil ER1. The operation input specified by a gesture can be the same operation input as a mouse operation, a touch panel operation, or the like.

Note that a gesture input may be received as a valid input after first detecting a change in the viewer 90 and switching the display. Gesture inputs may also be limited to operations relating to the attached information display screen. By doing so, the image display apparatus 50 makes it easy for the user to grasp a state in which gesture inputs are valid and the operations for which gesture inputs are valid. For an operation content that was performed by a right click operation using the mouse 39, the image display apparatus 50 is capable of switching the display in accordance with movement of the viewer 90 instead of a right click being inputted and of receiving a gesture input instead of a pointing, selecting, or confirmation operation inputted using the mouse 39. By doing so, the image display apparatus 50 is capable of improving operability for the user and improving the processing efficiency for the user.

Next, modifications to the image display and virtual space layout of display objects will be described with reference to FIG. 21 to FIG. 29. FIG. 21 to FIG. 29 are diagrams showing modifications to the image display and virtual space layout of display objects according to the second embodiment.

Figure 21:
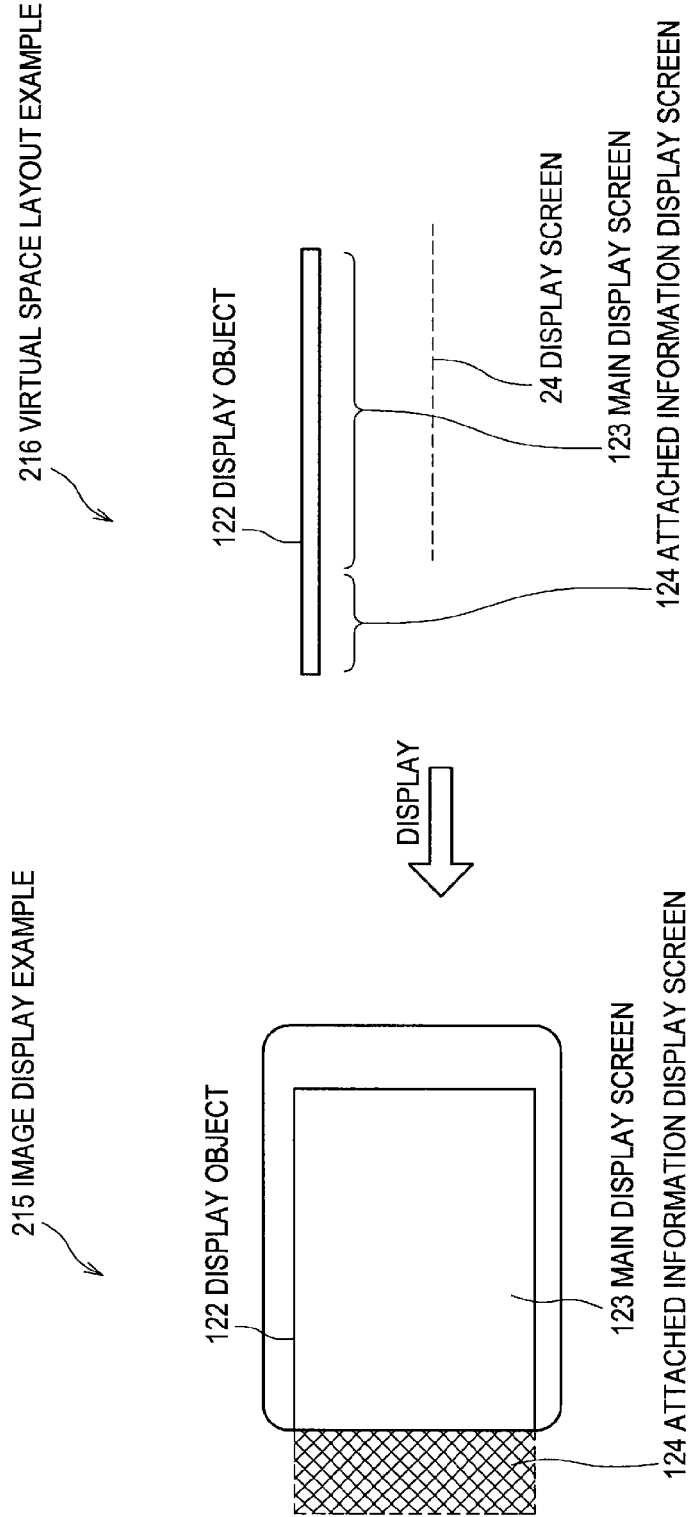
FIG. 21 is a diagram showing a modification of an image display and a virtual space layout of a display object according to the second embodiment.

First, a display example where display switching is carried out for an attached information display screen present outside the display region of the 3D image display apparatus 20 so as to display the attached information display screen inside the display region will be described in FIG. 21 and FIG. 22.

A virtual space layout example 216 (see FIG. 21) shows how a display object 122 appears when the viewer 90 is directly facing the display screen 24 (before display switching). The display object 122 is shaped like a thin plate and is positioned behind the plane of the display screen 24. The display object 122 includes a main display screen 123 and an attached information display screen 124 that are aligned on the same surface and are oriented toward the display screen 24. The main display screen 123 is inside the display region that can be viewed by the viewer 90 who directly faces the display screen 24, and the attached information display screen 124 is outside the display region and therefore is not viewed by the viewer 90 (see image display example 215).

A virtual space layout example 218 (see FIG. 22) shows how a display object 125 appears when the viewer 90 is not directly facing the display screen 24 (after display switching). The display object 125 is shaped like a thin plate and is positioned behind the plane of the display screen 24. The display object 125 includes a main display screen 126 and an attached information display screen 127 that are oriented toward the display screen 24 at an angle. The display object 125 is a display object where the position and orientation of the display object 122 (see FIG. 21) have changed. The display object 125 is disposed inside the virtual space with a position and orientation such that the attached information display screen 127 is close to the display screen 24.

Figure 22:
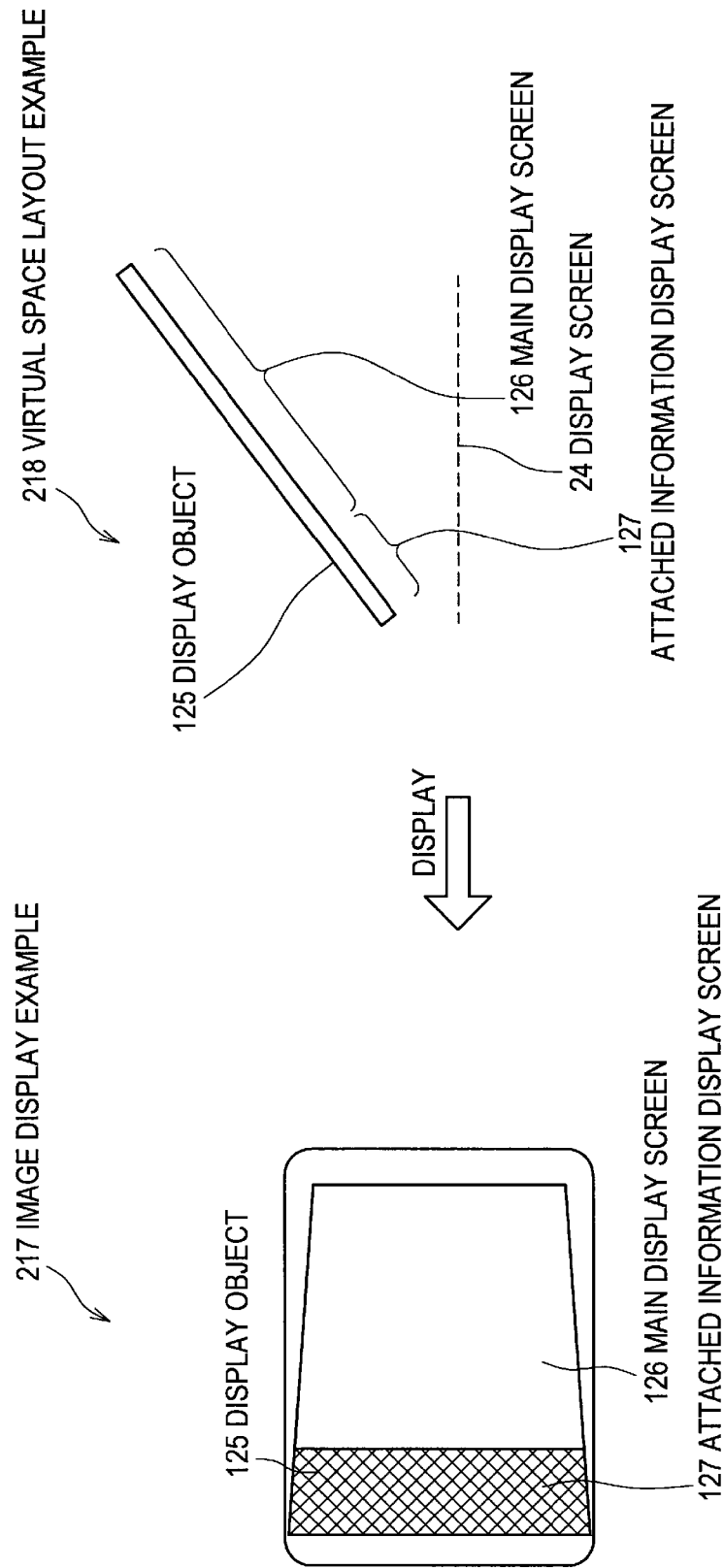
FIG. 22 is a diagram showing a modification of an image display and a virtual space layout of a display object according to the second embodiment.

This display object 125 is viewed by the viewer 90 as in an image display example 217 (see FIG. 22). For the display object 125 after display switching, the display state is updated by changing the orientation and changing the position so that the attached information display screen 127 is in a display state that is easy to view for the viewer 90. The display state of the attached information display screen 127 can be said to have changed from the non-displayed state of the attached information display screen 124 of the display object 122 before display switching to a display state that is easy to view for the viewer 90.

Figure 23:
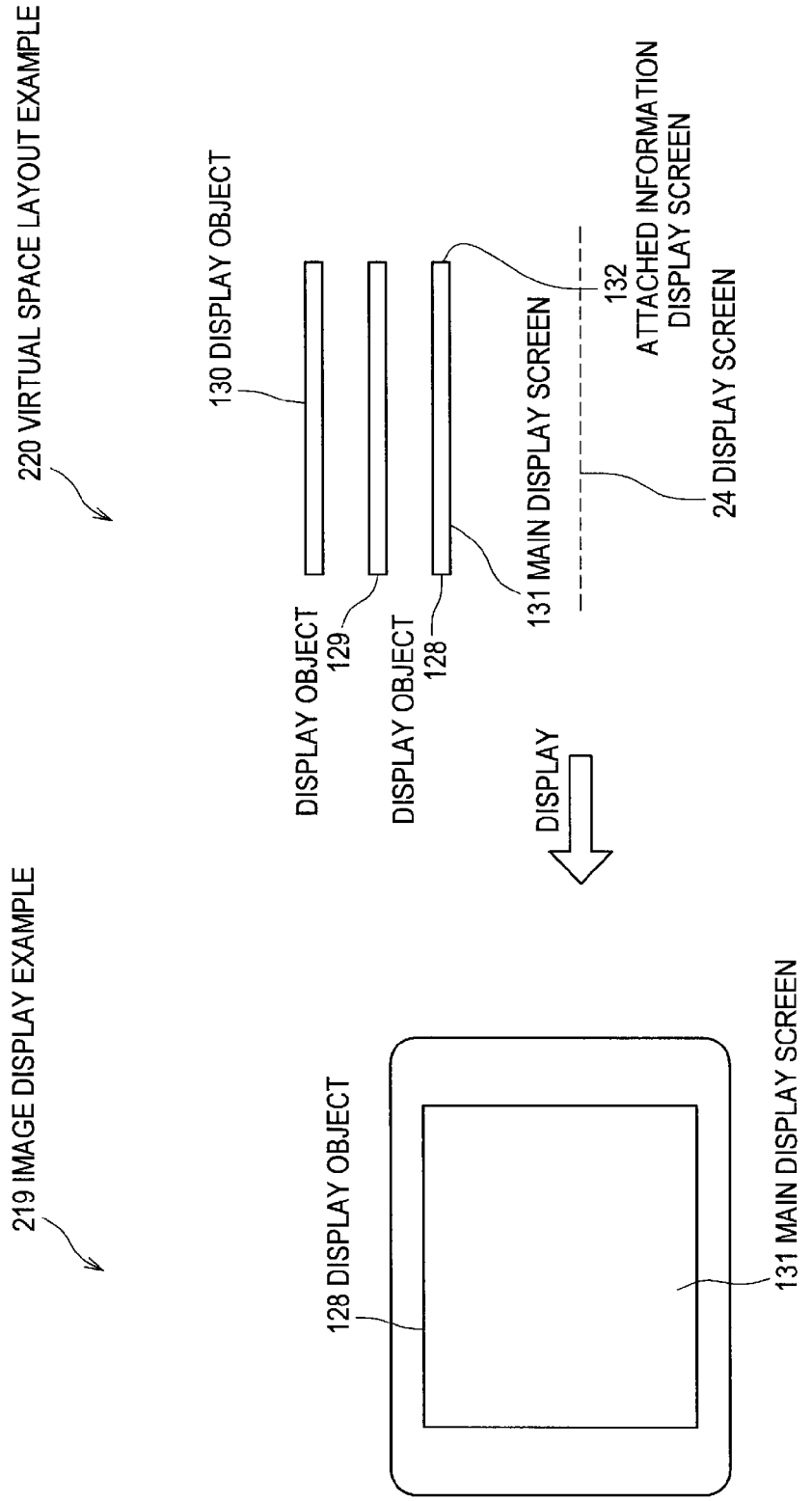
FIG. 23 is a diagram showing a modification of an image display and a virtual space layout of display objects according to the second embodiment.
Figure 24:
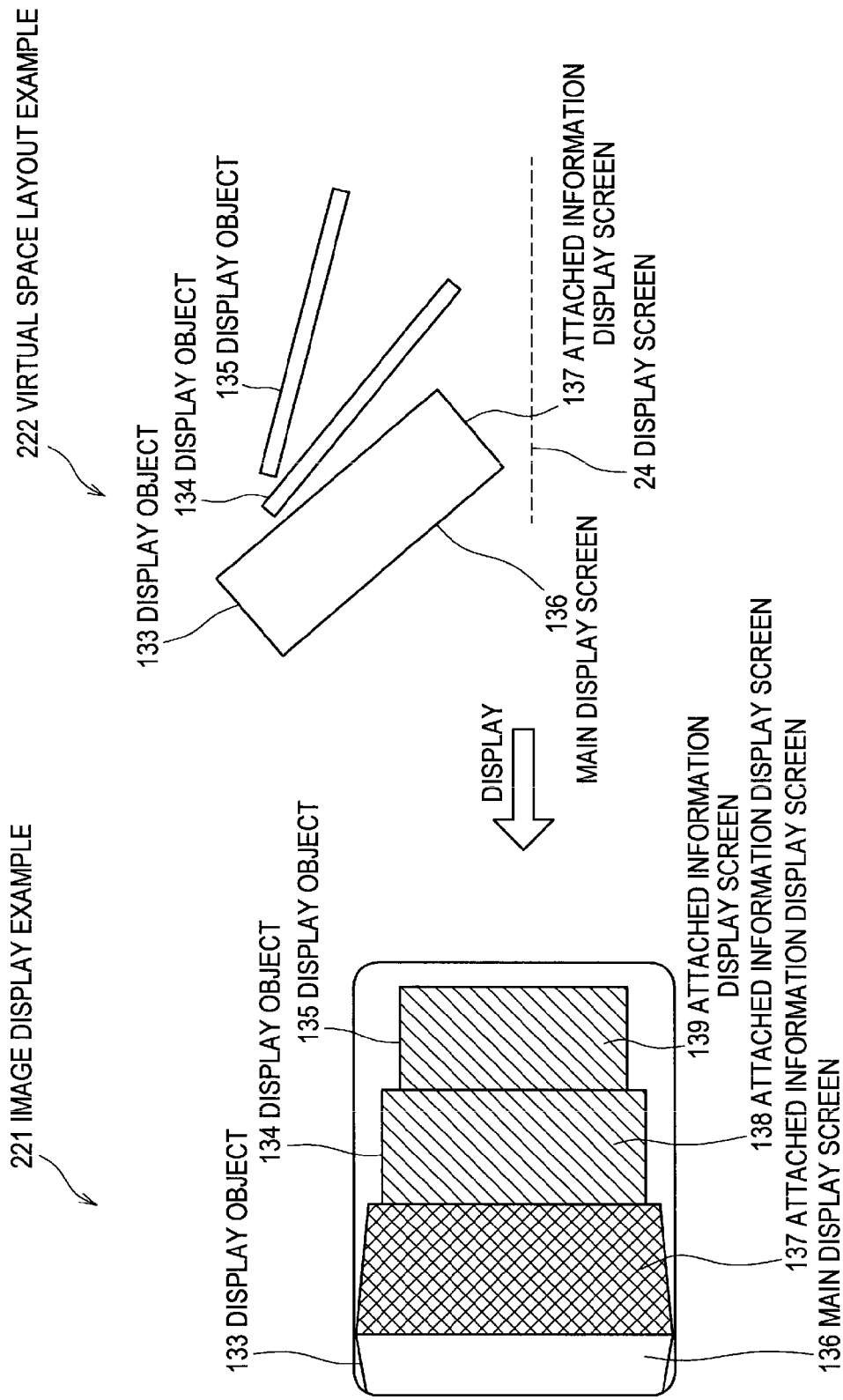
FIG. 24 is a diagram showing a modification of an image display and a virtual space layout of display objects according to the second embodiment.

Next, a display example where an attached information display screen is displayed in the display region of the 3D image display apparatus 20 by switching the display in accordance with a rearranging of the plurality of display objects will be described with reference to FIG. 23 and FIG. 24. For example, the display objects subjected to rearranging are windows, icons and the like that have been disposed superimposed on one another.

A virtual space layout example 220 (see FIG. 23) shows how the display objects 128, 129, and 130 appear when the viewer 90 is directly facing the display screen 24 (before display switching). The display objects 128, 129, and 130 are respectively shaped like thin plates and are aligned behind the plane of the display screen 24. A main display screen 131 of the display object 128 is oriented toward the display screen 24 and an attached information display screen 132 is oriented toward the side. Such display object 128 is viewed by the viewer 90 as in an image display example 219 (see FIG. 23). The main display screen 131 of the display object 128 is in an easy-to-view state for the viewer 90 but an attached information display screen 132 is not viewed. Also, the display objects 129, 130 are positioned behind the display object 128 and are not viewed by the viewer 90.

A virtual space layout example 222 (see FIG. 24) shows how the display objects 133, 134, and 135 appear when the viewer 90 is not directly facing the display screen 24 (after display switching). Note that the display objects 133, 134, and 135 respectively correspond to the display objects 128, 129, and 130 before display switching.

The display object 133 is shaped like a rectangular parallelepiped and is positioned behind the plane of the display screen 24. A main display screen 136 and an attached information display screen 137 of the display object 133 are oriented toward the front at an angle. This display object 133 is viewed by the viewer 90 as in an image display example 221 (see FIG. 24). For the display object 133 after display switching, the display state is updated by deformation, changing the position, and changing the orientation so that the attached information display screen 137 is in a display state that is easy to view for the viewer 90. The display state of the attached information display screen 137 can be said to have changed from the non-displayed state of the attached information display screen 132 of the display object 128 before display switching to the display state that is easy to view for the viewer 90.

The display state of the display objects 134, 135 are updated by changing the position and changing the orientation from the state where such objects were aligned with the display object 133. By doing so, the display objects 134, 135 are placed in a display state where the attached information display screens 138, 139 that were not displayed in the display before switching become easy to view for the viewer 90. Note that the display objects 134, 135 may be placed in a display state where the main display screens become easy to view either in addition to or in place of the attached information display screens 138, 139 placed in a display state that is easy to view.

Figure 25:
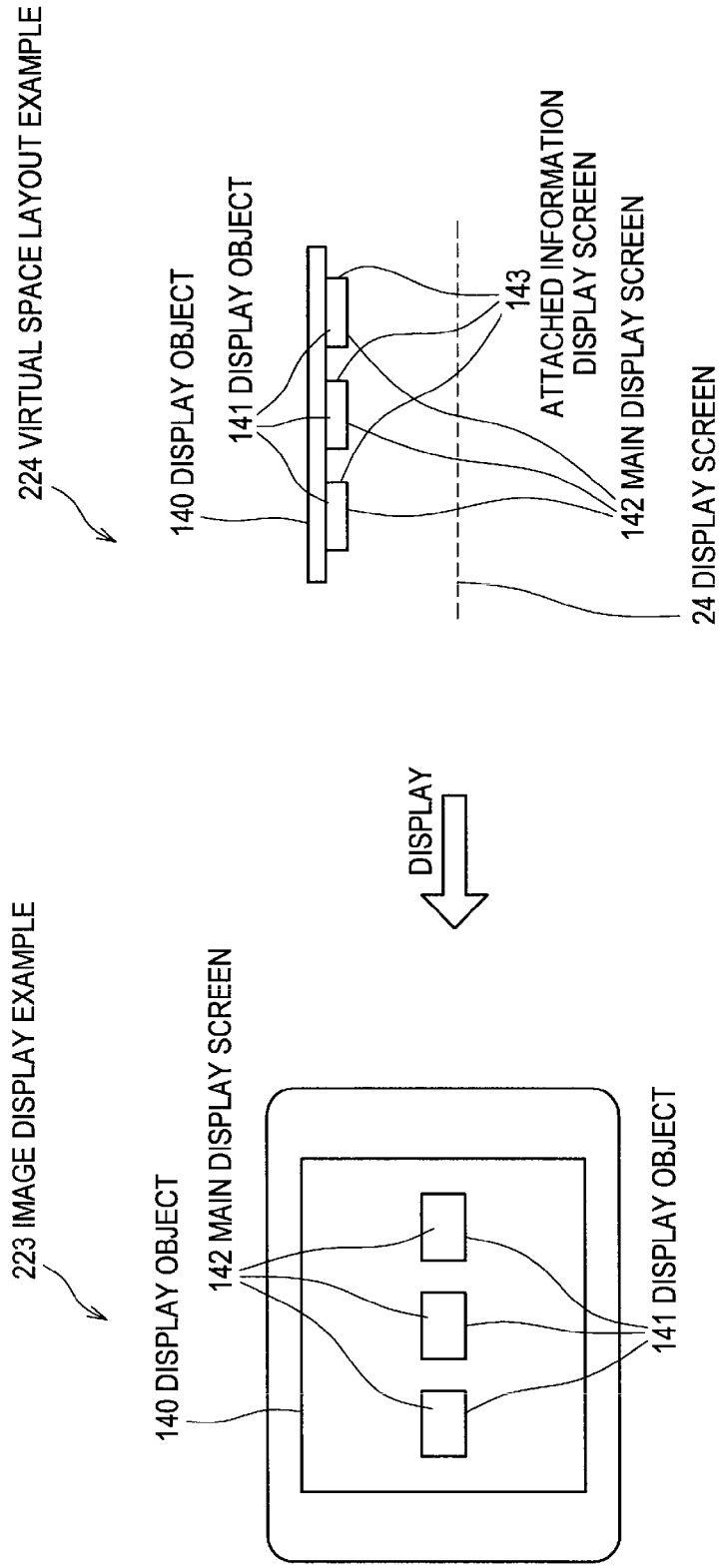
FIG. 25 is a diagram showing a modification of an image display and a virtual space layout of display objects according to the second embodiment.
Figure 26:
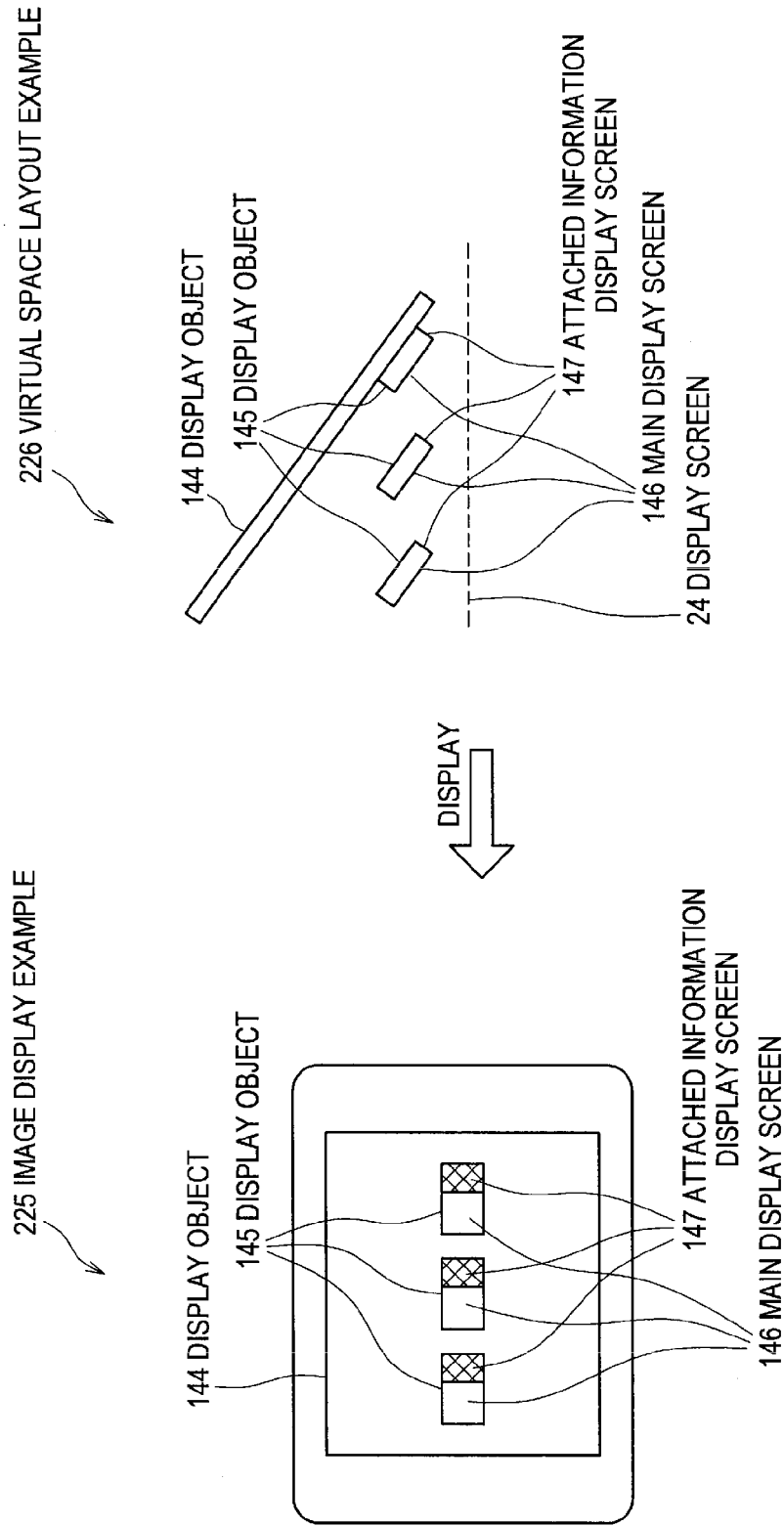
FIG. 26 is a diagram showing a modification of an image display and a virtual space layout of display objects according to the second embodiment.
Figure 27:
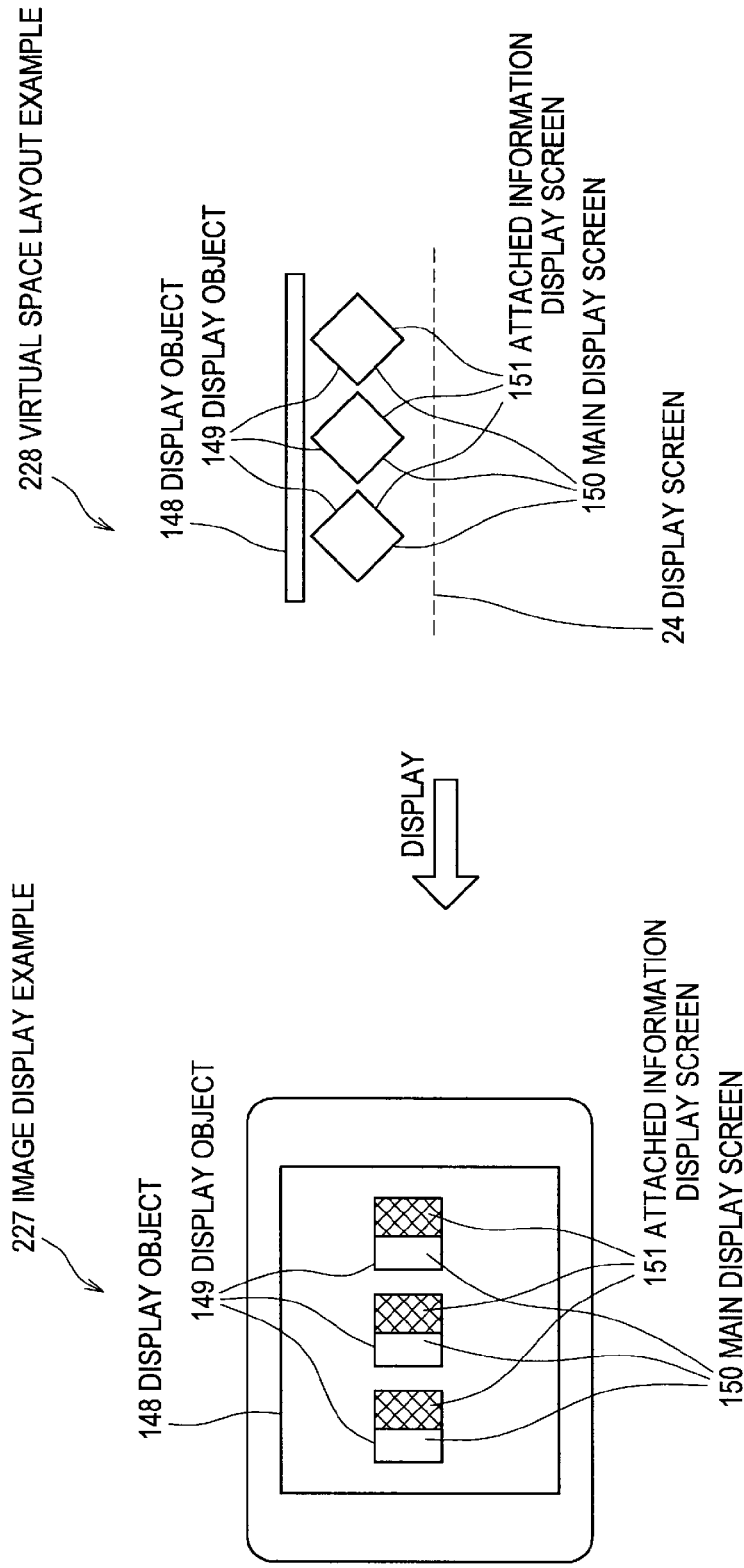
FIG. 27 is a diagram showing a modification of an image display and a virtual space layout of display objects according to the second embodiment.

Next, a display example where attached information display screens are displayed inside the display region of the 3D image display apparatus 20 by switching the display in accordance with a rearranging of a plurality of display objects disposed on a single display object will be described with reference to FIG. 25 to FIG. 27. For example, the display objects that are rearranged are icons or the like disposed in a window.

A virtual space layout example 224 (see FIG. 25) shows how the display objects 140, 141 appear when the viewer 90 is directly facing the display screen 24 (before display switching). The plurality of display objects 141 are shaped like thin plates and are disposed in front of the display object 140 that is also shaped like a thin plate. The display objects 140, 141 are both positioned behind the plane of the display screen 24. A main display screen 142 of each display object 141 is oriented toward the display screen 24 and an attached information display screen 143 is oriented toward the side. Such display objects 141 are viewed by the viewer 90 as in an image display example 223 (see FIG. 25). The main display screen 141 of each display object 142 is in an easy-to-view state for the viewer 90 but the attached information display screen 143 is not viewed.

A virtual space layout example 226 (see FIG. 26) shows how the display objects 144 and 145 appear when the viewer 90 is not directly facing the display screen 24 (after display switching). Note that the display objects 144, 145 respectively correspond to the display objects 140, 141 before display switching.

The display objects 144, 145 are both shaped like rectangular parallelepipeds and are positioned behind the plane of the display screen 24. A main display screen 146 and an attached information display screen 147 of each display object 145 are oriented toward the front at an angle. These display objects 145 are viewed by the viewer 90 as in an image display example 225 (see FIG. 26). For the display objects 145 after display switching, the display state is updated by changing the position and changing the orientation so that the respective attached information display screens 147 are in a display state that is easy to view for the viewer 90. The display states of the attached information display screens 147 can be said to have changed from the non-displayed states of the attached information display screens 143 of the display objects 141 before display switching to display states that are easy to view for the viewer 90.

In this way, the display states of the display objects 145 are changed independently of the display object 144 in the background. In other words, the display states of the plurality of display objects 145 in the virtual space are changed by changing the relative positional relationships. By doing so, even if the display objects 145 are associated with the display object 144, it is still possible to change the viewing states of the attached information display screens 147 to an easy to view state independently of the viewing state of the display object 144.

A virtual space layout example 228 (see FIG. 27) shows how display objects 148 and 149 appear when the viewer 90 is not directly facing the display screen 24 (after display switching). Note that the display objects 148, 149 respectively correspond to the display objects 140, 141 before display switching.

The display objects 148, 149 are both shaped like cubes and are positioned behind the plane of the display screen 24. A main display screen 150 and an attached information display screen 151 of the display objects 149 are oriented toward the front at an angle. These display objects 149 are viewed by the viewer 90 as in an image display example 227 (see FIG. 27). For the display objects 149 after display switching, the display state is updated by deformation, changing the position and changing the orientation so that each attached information display screen 151 is in a display state that is easy to view for the viewer 90. The display states of the attached information display screens 151 can be said to have changed from the non-displayed states of the attached information display screens 143 of the display objects 141 before display switching to display states that are easy to view for the viewer 90.

In this way, the display states of the display objects 149 are changed independently of the display object 148 in the background. By doing so, even if the display objects 149 are associated with the display object 148, it is still possible to change the viewing states of the attached information display screens 151 to a viewing state that is easy to view independently of the viewing state of the display object 148.

Figure 28:
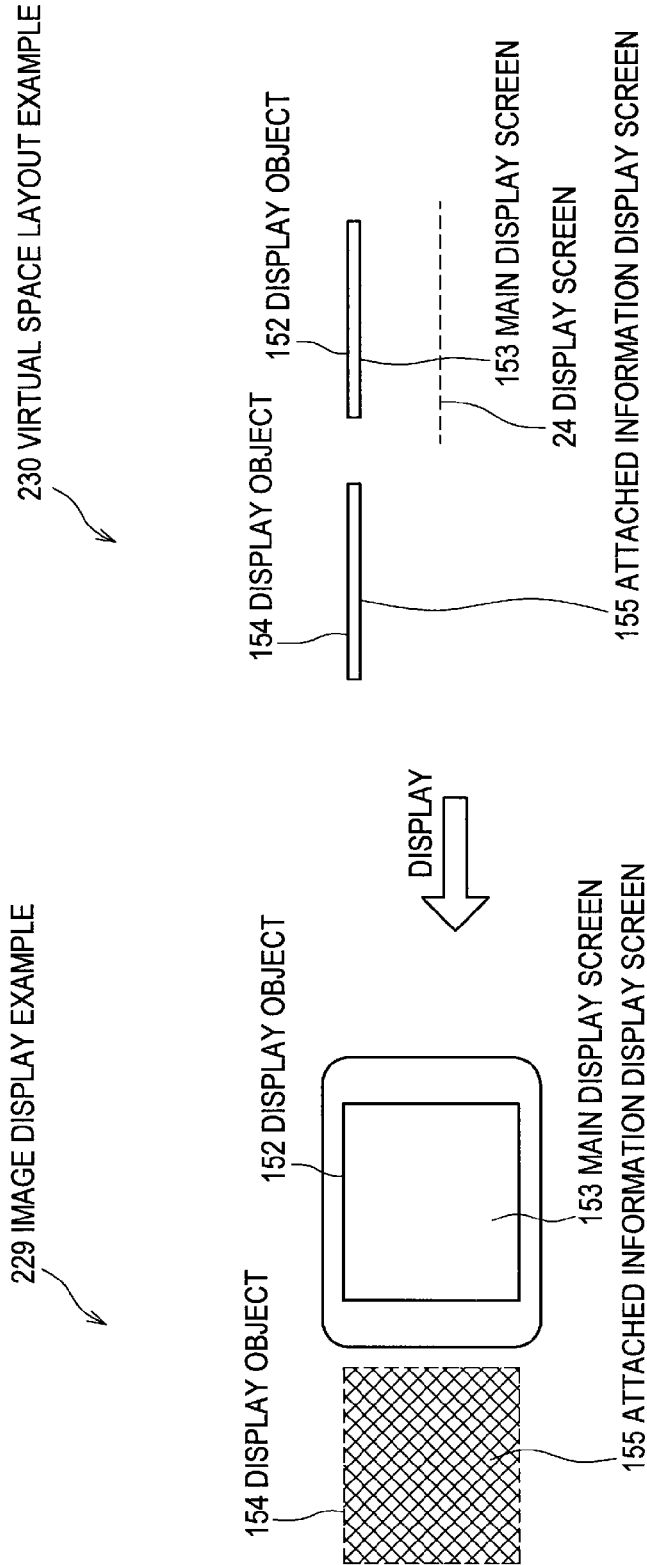
FIG. 28 is a diagram showing a modification of an image display and a virtual space layout of display objects according to the second embodiment.
Figure 29:
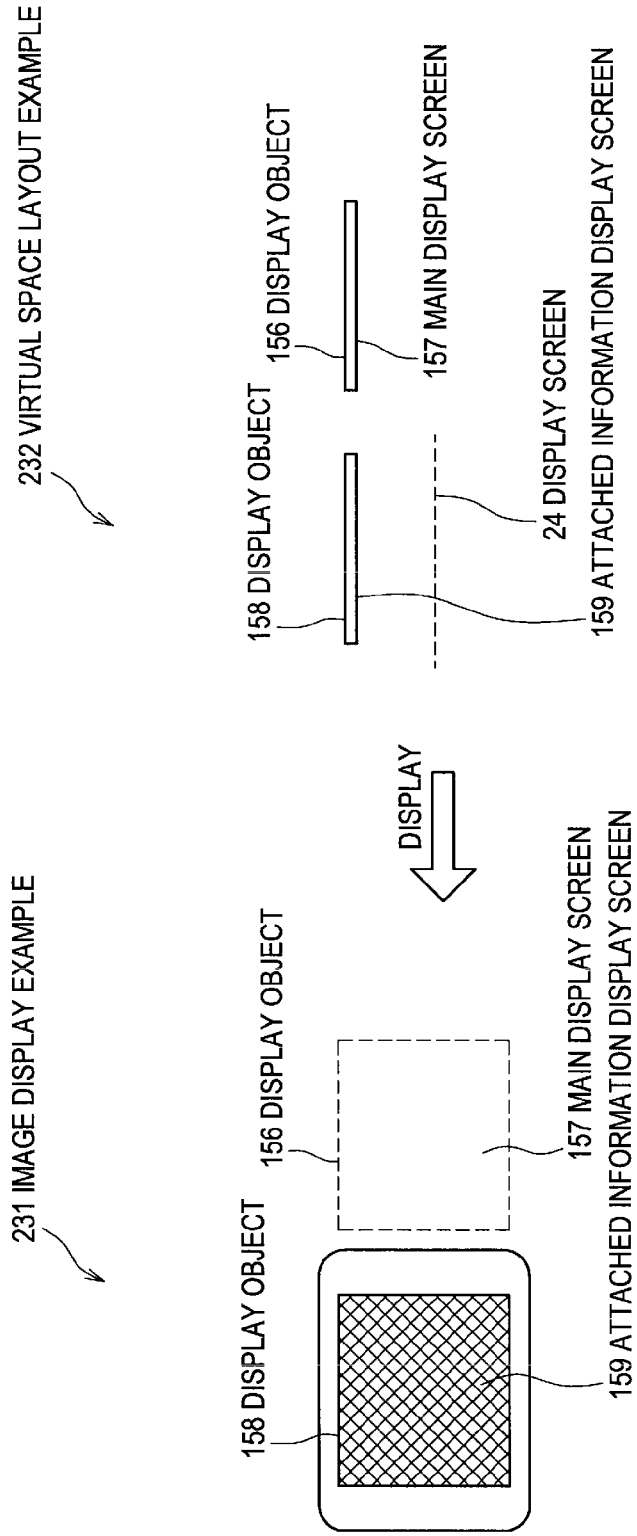
FIG. 29 is a diagram showing a modification of an image display and a virtual space layout of display objects according to the second embodiment.

Next, a display example where an attached information display screen present outside the display region of the 3D image display apparatus 20 is displayed inside the display region by switching the display will be described with reference to FIG. 28 and FIG. 29. This differs to the modification described with reference to FIG. 21 and FIG. 22 in that the main display screen and the attached information display screen are displayed on different display objects.

A virtual space layout example 230 (see FIG. 28) shows how the display objects 152, 154 appear when the viewer 90 is directly facing the display screen 24 (before display switching). The display object 152 includes a main display screen 153 on a front surface thereof and the display object 154 includes an attached information display screen 155 on the front surface thereof. The display objects 152, 154 are shaped like thin plates and are positioned behind the plane of the display screen 24.

The display objects 152, 154 have the main display screen 153 and the attached information display screen 155 respectively oriented toward the display screen 24. The main display screen 153 is inside the display region and can be viewed by the viewer 90 who is directly facing the display screen 24 and the attached information display screen 155 is outside the display region and is not viewed by the viewer 90 (see image display example 229).

A virtual space layout example 232 (see FIG. 29) shows how the display objects 156, 158 appear when the viewer 90 is not directly facing the display screen 24 (after display switching). The display objects 156, 158 are shaped like thin plates and are positioned behind the plane of the display screen 24. The position of the display objects 156, 158 in the virtual space is changed while maintaining the relative positional relationship between the objects within the virtual space. The main display screen 157 after the change in the position is outside the display region and is not viewed by the viewer 90 who directly faces the display screen 24, and the attached information display screen 159 is inside the display region and can be viewed by the viewer 90 (see the image display example 231).

The display state of the display objects 156, 158 after switching are updated by changing the positions and are placed in a display state where the attached information display screen 159 becomes easy to view for the viewer 90. The display state of the attached information display screen 159 can be said to have changed from the non-displayed state of the attached information display screen 155 of the display object 154 before display switching to a display state that is easy to view for the viewer 90.

Third Embodiment

Figure 30:
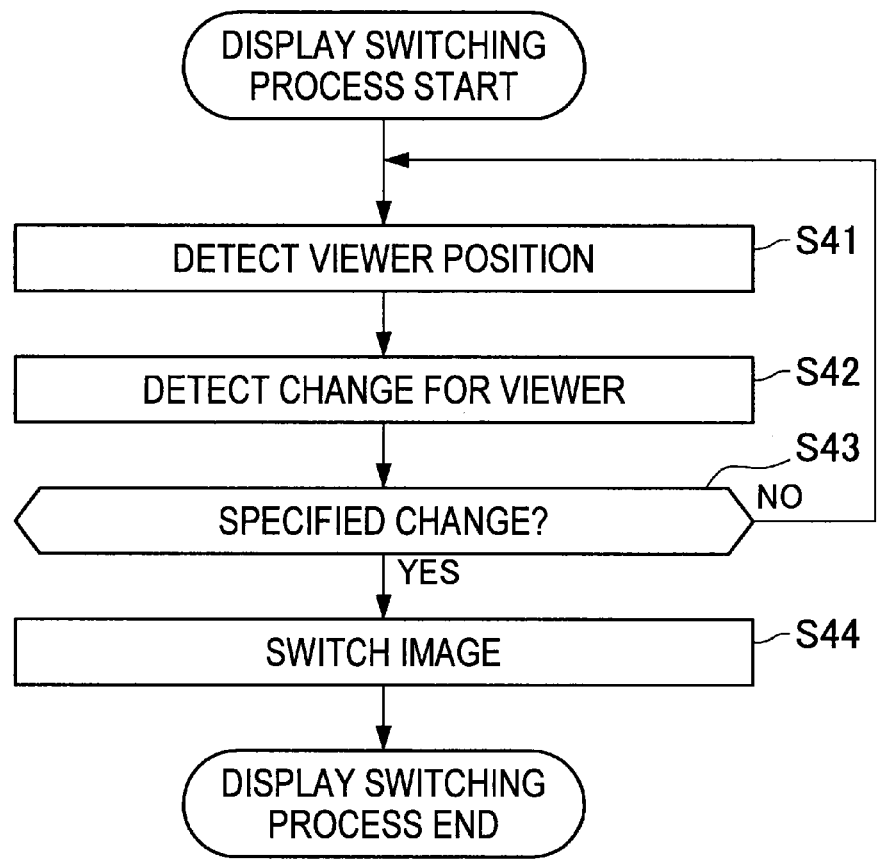
FIG. 30 is a flowchart of a display switching process according to a third embodiment.

A display switching process according to the third embodiment will now be described with reference to FIG. 30. FIG. 30 is a flowchart of a display switching process according to the third embodiment. The display switching process according to the third embodiment differs to the display switching process according to the second embodiment in that a display image prepared in advance is switched to without a display image being generated based on the switching information. Since display switching including position detection for the viewer 90 is carried out, the switching trigger detection process according to the second embodiment is not carried out in the third embodiment. The information processing apparatus 30 executes the display switching process in parallel with execution of an application in the same way as the second embodiment.

Step S41
The information processing apparatus 30 carries out position detection for the viewer 90 based on an input from the image pickup apparatus 22.
Step S42
The information processing apparatus 30 detects a specified change in the position of the viewer 90.
Step S43
If a specified change has been detected for the position of the viewer 90, the information processing apparatus 30 proceeds to step S44, but if the specified change has not been detected, the processing returns to step S41.
Step S44
The information processing apparatus 30 carries out switching to a display image where the attached information display screen is easy to view and ends the display switching process.

By having the first display image and the second display image where the attached information display screen is easy to view compared to the first display image prepared in advance, the information processing apparatus 30 is capable of easily switching to a display image where the attached information display screen is easy to view.

Note that although the image display apparatus 50 includes the 3D image display apparatus 20 that displays images for two viewpoints (i.e., the right-eye image and the left-eye image), the image display apparatus 50 may include a 3D image display apparatus for multiple viewpoints. In this case, the image display apparatus 50 displays images, such as those displayed by the 3D image display apparatus 20 before and after switching, on the multiple-viewpoint 3D image display apparatus corresponding to different viewpoints.

Note that the processing function described above can be realized by a computer. In such case, there is provided a program in which the processing content of the functions to be provided in the respective apparatuses is written. By having such program executed by a computer, the processing functions described above are realized by a computer. The program in which the processing content is written can be recorded on a computer-readable recording medium.

To distribute such a program, as one example it is possible to sell a removable recording medium, such as a DVD (Digital Versatile Disc) or a CD-ROM (Compact Disc Read Only Memory), on which the program is recorded. Alternatively, the program can be stored in advance in a storage apparatus of a server computer and transferred via a network from the server computer to another computer.

The computer executing the program may for example store the program that is stored on the removable recording medium or the program that has been transferred from the server computer in its own storage apparatus. After this, the computer may read the program from its own storage apparatus and execute processing in accordance with the program.

Note that the present disclosure may be configured as described below.
(1) An information processing apparatus comprising:
    a display output unit outputting a main display and an attached information display displaying attached information relating to the main display to a 3D image display apparatus that a viewer is capable of viewing using binocular parallax;
    a position information input unit inputting position information of the viewer viewing the 3D image display apparatus;
    a change detecting unit detecting a change in the position information; and a switching unit switching, based on detection of the change, a display state of the attached information display from a first display state to a second display state where the attached information display is easy for the viewer to view compared to the first display state.

(2) An information processing apparatus according to (1), wherein the attached information is operation information relating to an operation of the main display.

(3) An information processing apparatus according to (2), further comprising a gesture detecting unit detecting, in the second display state, a selection operation relating to the operation information from a gesture of the viewer.

(4) An information processing apparatus according to (1), wherein the attached information is attribute information relating to attributes of the main display.

(5) An information processing apparatus according to any one of (1) to (4), wherein the attached information is not displayed in the first display state.

(6) An information processing apparatus according to any one of (1) to (5), wherein the main display and the attached information display are displayed on respectively different surfaces of a display object composed of a polyhedron.

(7) An information processing apparatus according to any one of (1) to (5), wherein the main display and the attached information display are displayed in regions produced by dividing a single surface of a display object.

(8) An information processing apparatus according to any one of (1) to (5), wherein the main display is displayed on a first display object and the attached information display is displayed on a second display object.

(9) An information processing apparatus according to any one of (1) to (8), wherein the switching unit is operable when switching from the first display state to the second display state, to switch a virtual viewpoint of a display object from a first virtual viewpoint to a second virtual viewpoint.

(10) An information processing apparatus according to any one of (1) to (9), wherein the switching unit is operable when switching from the first display state to the second display state, to change a size of a display object.

(11) An information processing apparatus according to any one of (1) to (10), wherein the switching unit is operable when switching from the first display state to the second display state, to change an orientation of a display object.

(12) An information processing apparatus according to any one of (1) to (11), wherein the switching unit is operable when switching from the first display state to the second display state, to change a shape of a display object.

(13) An information processing apparatus according to any one of (1) to (12), wherein the switching unit is operable when switching from the first display state to the second display state, to change a light source of a display object.

(14) An information processing apparatus according to any one of (1) to (13), wherein the switching unit is operable when switching from the first display state to the second display state, to change a relative positional relationship between a plurality of display objects.

(15) An image display apparatus comprising:
a 3D image display unit displaying a main display and an attached information display displaying attached information relating to the main display by way of a 3D image that a viewer is capable of viewing using binocular parallax;
a position detecting unit detecting a position of the viewer viewing the 3D image display unit;
a change detecting unit detecting a change in the position; and
a switching unit switching, based on detection of the change, a display state of the attached information display from a first display state to a second display state where the attached information display is easy for the viewer to view compared to the first display state.

(16) An information processing method executed by an information processing apparatus comprising:
outputting a main display and an attached information display displaying attached information relating to the main display to a 3D image display apparatus that a viewer is capable of viewing using binocular parallax;
inputting position information of the viewer viewing the 3D image display apparatus;
detecting a change in the position information; and
switching, based on detection of the change, a display state of the attached information display from a first display state to a second display state where the attached information display is easy for the viewer to view compared to the first display state.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1,30 Information processing apparatus
2 Position information input unit
3 Change detecting unit
4 Switching unit
5 Display output unit
6,6a,6b Main display
7 Attached information display (first display state)
8 Attached information display (second display state)
9, 9a, 9b, 90 Viewer
10 Display apparatus
11,22 Image pickup apparatus
20 3D image display apparatus
21 LCD
23 Lenticular lens
24 Display screen
31 CPU
32 RAM
33 HDD
34 Communication interface
35 Graphics processing apparatus
36 Input/output interface
37 Bus
38 Keyboard
39 Mouse
41 Removable recording medium
50 Image display apparatus
91 Trunk
92 Head
93 Arm 94,94a,94b,94c,94d,94e,94f Hand
95 Face
100,100a,100b,110,113,116,119,122,125,128,129,130,133, 134,135,140,141,144,145, 148,149,152,154,156,158 Display object
101,111,114,117,120,123,126,131,136,142,146,150,153,157 Main display screen
102,102a,102b,112,115,118,121,124,127,132,137,138,139, 143,147,151,155,159 Attached information display screen
103 Operation information
104 Attribute information
105L,105R,107L,107R Virtual viewpoint
106,108 Light source
EL Left eye
EL1 Left pupil
ER Right eye
ER1 Right pupil
P1,P2 Viewing position
ZL Left-eye image viewing zone
ZR Right-eye image viewing zone

The invention claimed is:

1. An information processing apparatus comprising a processor for controlling displaying of a display object having a main display and an attached information display in a three-dimensional (3D) image, and for controlling changing a display state of the attached information display from a first display state to a second display state based on movement of a viewer from a first position to a second position, when the viewer is in the first position and the display state is the first display state the processor is configured to control display of the display object so that the main display is displayed on a front portion of the display object and the attached information is displayed on a side portion of the display object and when the viewer moves to the second position the processor is configured to cause the display state to change to the second display state wherein the attached information is caused to be displayed on the front portion of the display object and the main display is caused to be displayed on the side portion of the display object, so that the viewer is provided with an improved view of the attached information display in said second state as compared to that provided in said first display state.

2. The information processing apparatus as recited in claim 1, wherein the attached information display displays information related to information displayed on the main display.

3. The information processing apparatus as recited in claim 1, wherein the main display displays an application interface.

4. The information processing apparatus as recited in claim 3, wherein the attached information display displays information relating to operations of the application.

5. The information processing apparatus as recited in claim 3, wherein the attached information display displays information relating to attributes of the application.

6. The information processing apparatus as recited in claim 1, wherein the display object is a polyhedron.

7. The information processing apparatus as recited in claim 1, wherein the movement of the viewer from the first position to the second position involves a movement of the viewer's head.

8. The information processing apparatus as recited in claim 1, wherein the apparatus is operable to detect a gesture of the viewer after the display state has been changed to the second display state, and wherein the gesture relates to information displayed in the attached information display.

9. An information processing method, comprising:
controlling displaying of a display object having a main display and an attached information display in a three-dimensional (3D) image; and
controlling changing a display state of the attached information display from a first display state to a second display state based on movement of a viewer from a first position to a second position,
when the viewer is in the first position and the display state is the first display state the display of the display object is controlled so that the main display is displayed on a front portion of the display object and the attached information is displayed on a side portion of the display object and when the viewer moves to the second position the display state is changed to the second display state wherein the attached information is caused to be displayed on the front portion of the display object and the main display is caused to be displayed on the side portion of the display object, so that the viewer is provided with an improved view of the attached information display in said second state as compared to that provided in said first display state.

10. The information processing method as recited in claim 9, wherein the attached information display displays information related to information displayed on the main display.

11. The information processing method as recited in claim 9, wherein the main display displays an application interface.

12. The information processing method as recited in claim 11, wherein the attached information display displays information relating to operations of the application.

13. The information processing method as recited in claim 11, wherein the attached information display displays information relating to attributes of the application.

14. A non-transitory computer-readable medium having stored thereon a computer-readable program for implementing an information processing method, the method comprising:
controlling displaying of a display object having a main display and an attached information display; and
controlling changing a display state of the attached information display from a first display state to a second display state based on movement of a viewer from a first position to a second position,
when the viewer is in the first position and the display state is the first display state the display of the display object is controlled so that the main display is displayed on a front portion of the display object and the attached information is displayed on a side portion of the display object and when the viewer moves to the second position the display state is changed to the second display state wherein the attached information is caused to be displayed on the front portion of the display object and the main display is caused to be displayed on the side portion of the display object, so that the viewer is provided with an improved view of the attached information display in said second state as compared to that provided in said first display state.

* * * * *